US009485368B2

(12) United States Patent
Nakamura

(10) Patent No.: US 9,485,368 B2
(45) Date of Patent: Nov. 1, 2016

(54) ELECTRONIC DOCUMENT GENERATION APPARATUS, RECORDING MEDIUM, AND ELECTRONIC DOCUMENT GENERATION SYSTEM

(71) Applicant: Konica Minolta, Inc., Chiyoda-ku, Tokyo (JP)

(72) Inventor: Teppei Nakamura, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/847,611

(22) Filed: Sep. 8, 2015

(65) Prior Publication Data

US 2016/0072968 A1 Mar. 10, 2016

(30) Foreign Application Priority Data

Sep. 8, 2014 (JP) .................. 2014-182664

(51) Int. Cl.
*G06F 3/12* (2006.01)
*H04N 1/00* (2006.01)
*G06K 9/00* (2006.01)
*G06K 15/00* (2006.01)

(52) U.S. Cl.
CPC ...... *H04N 1/00241* (2013.01); *G06K 9/00463* (2013.01); *G06K 2209/01* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| 7,633,639 | B2* | 12/2009 | Ohishi | ............... H04N 1/00222 358/1.13 |
| 2005/0286752 | A1* | 12/2005 | Takiguchi | ................ G06K 9/32 382/139 |
| 2013/0054222 | A1* | 2/2013 | Sharma | .............. G06K 9/00442 704/2 |

FOREIGN PATENT DOCUMENTS

| JP | 2009-48293 | 3/2009 |
| JP | 2012-73749 | 4/2012 |

* cited by examiner

*Primary Examiner* — Dov Popovici
(74) *Attorney, Agent, or Firm* — Buchanan Ingersoll & Rooney PC

(57) ABSTRACT

An electronic document generation apparatus generates a recognition object image by performing an image processing on a scan image so that each of a plurality of line areas extracted from a character area of the scan image should be determined as a unit recognition area and transmits the recognition object image to the cloud server. The apparatus further receives text data which is a processing result of an optical character recognition processing on the recognition object image, in which a delimiter code is added at the end of a character recognition result for each of a plurality of unit recognition areas, from the cloud server, separates the text data into a plurality of character string data on the basis of the delimiter code, and generates an electronic document by arranging each of the plurality of character string data in the line area corresponding to each character string data.

25 Claims, 24 Drawing Sheets

ELECTRONIC DOCUMENT GENERATION APPARATUS, RECORDING MEDIUM, AND ELECTRONIC DOCUMENT GENERATION SYSTEM

This application is based on Japanese Patent Application No. 2014-182664 filed on Sep. 8, 2014, the contents of which are hereby incorporated by reference.

BACKGROUND OF THE INVENTION

1. Field of the Invention

The present invention relates to an electronic document generation apparatus which generates an electronic document and its relevant technique.

2. Description of the Background Art

As to an image forming apparatus such as an MFP (Multi-Functional Peripheral), there have been techniques for generating an electronic document by scanning an original.

Among such techniques, there is a technique for generating an electronic document with text data (described below) (see Japanese Patent Application Laid Open Gazette No. 2012-73749: Patent Document 1), as well as a technique for generating an electronic document by capturing a scan image of the original without any change. Specifically, by performing an optical character recognition processing (hereinafter, referred to also as an OCR (Optical Character Recognition) processing) on a scan image of an original (especially, an image indicating characters), text data of the characters in the scan image is automatically recognized and the text data is superimposed on the scan image in a non-display state and embedded therein. Thus, generated is an electronic document (electronic document with text data) of predetermined format, which is termed a PDF (Portable Document Format) file with transparent text (or searchable PDF file) or the like.

Further, there has also been a technique for providing a versatile OCR processing service using a cloud server.

Actually, it is thought that the following operation can be performed by using the above techniques. For example, a scan image is transmitted from an electronic document generation apparatus to a cloud server, and an OCR processing is performed on the entire scan image by the cloud server. Then, the processing result (text data) is transmitted back to the electronic document generation apparatus from the cloud server, and the electronic document generation apparatus embeds the text data received from the cloud server into the original scan image, to thereby generate an electronic document with text data (searchable PDF file (PDF file with transparent text) or the like). Further, since another apparatus other than the electronic document generation apparatus can perform the OCR processing by using the versatile OCR processing service, it is possible to reduce the processing load of the electronic document generation apparatus.

In some of the versatile OCR processing services, a character area in a scan image is separated into predetermined unit areas (each of which can include an area larger than a line area for one line) (for example, paragraph areas) and an OCR processing is performed on each of the separated areas, to thereby generate text data as an OCR processing result, in which a delimiter code (line feed code or the like) is added at the end of a character string in each of the predetermined unit areas. When the electronic document generation apparatus receives the text data from the cloud server, the apparatus separates the character string in the text data into a plurality of ones on the basis of the delimiter codes in the text data and arranges each of the character strings in the corresponding predetermined unit area (paragraph area or the like) in the scan image, to thereby generate an electronic document.

In such versatile OCR processing services, however, an area including a plurality of lines of character strings is usually recognized as one paragraph area or the like, and text data is generated, in which a delimiter code is added only at the end of the whole character string for a plurality of lines. In other words, outputted is the text data in which no delimiter code is added at the end of a character recognition result of each line (other than the last line of the paragraph) of a plurality of lines forming the paragraph and character recognition results (OCR processing results) for a plurality of lines of character strings are continuous with one another. For this reason, the electronic document generation apparatus cannot grasp the correspondence between a character image for each line in the scan image and the character recognition result for each line, and consequently, the character recognition result for each line may not be arranged in a proper position (the position of the character image for each line corresponding to the character recognition result for each line) in the scan image. If the text data is outputted, in which the character recognition result for the first line and that for the second line are continuous with each other, for example, the character recognition result for the second line is arranged around the line end of the character image for the first line in the scan image, being continuous with the character recognition result for the first line (not line-fed), but not arranged at the proper position (the position of the character image for the second line in the scan image).

SUMMARY OF THE INVENTION

It is an object of the present invention to provide a technique for generating an electronic document in which an OCR processing result is arranged at a proper position in a scan image.

The present invention is intended for an electronic document generation apparatus generating an electronic document in cooperation with a cloud server which separates a character area in a processing object image for an optical character recognition processing into a plurality of unit recognition areas each of which can include an area larger than a line area for one line and performs the optical character recognition processing on each of the plurality of unit recognition areas, the cloud server generating text data as a processing result of the optical character recognition processing on the processing object image, the text data including a character recognition result for each of the plurality of unit recognition areas and a delimiter code added at the end of the character recognition result for each of the plurality of unit recognition areas. According to a first aspect of the present invention, the electronic document generation apparatus includes an extraction part for extracting each of a plurality of line areas from a character area of a scan image of an original, an image generation part for generating a recognition object image by performing an image processing on the scan image so that the each of the plurality of line areas should be determined by the cloud server as a unit recognition area, a transmitting part for transmitting the recognition object image to the cloud server as the processing object image for the optical character recognition processing, a receiving part for receiving the text data which is the processing result of the optical character recognition processing on the recognition object image, from the cloud server, and a document generation part for separating the text data into a plurality of character string data on the basis of the delimiter code included in the text data, determining a correspondence between the plurality of line areas and the plurality of character string data, and generating the electronic document by arranging each of the plurality of character string data in the line area corresponding to the character string data.

The present invention is also intended for a non-transitory computer-readable recording medium. According to a second aspect of the present invention, the non-transitory computer-readable recording medium records therein a computer program to be executed by a computer embedded in an electronic document generation apparatus generating an electronic document in cooperation with a cloud server which separates a character area in a processing object image for an optical character recognition processing into a plurality of unit recognition areas each of which can include an area larger than a line area for one line and performs the optical character recognition processing on each of the plurality of unit recognition areas, the cloud server generating text data as a processing result of the optical character recognition processing on the processing object image, the text data including a character recognition result for each of the plurality of unit recognition areas and a delimiter code added at end of the character recognition result for the each of the plurality of unit recognition areas, to cause the computer to perform the steps of a) extracting each of a plurality of line areas from a character area of a scan image of an original, b) generating a recognition object image by performing an image processing on the scan image so that each of the plurality of line areas should be determined by the cloud server as a unit recognition area, c) transmitting the recognition object image to the cloud server as the processing object image for the optical character recognition processing, d) receiving the text data which is the processing result of the optical character recognition processing on the recognition object image, from the cloud server, e) separating the text data into a plurality of character string data on the basis of the delimiter code included in the text data and determining a correspondence between the plurality of line areas and the plurality of character string data, and f) generating the electronic document by arranging each of the plurality of character string data in the line area corresponding to the character string data.

The present invention is further intended for an electronic document generation system. According to a third aspect of the present invention, the electronic document generation system includes an image forming apparatus for generating a scan image of an original and an electronic document generation apparatus for generating an electronic document on the basis of the scan image in cooperation with a cloud server, and in the electronic document generation system of the present invention, the cloud server separates a character area in a processing object image for an optical character recognition processing into a plurality of unit recognition areas each of which can include an area larger than a line area for one line and performs the optical character recognition processing on each of the plurality of unit recognition areas, and generates text data as a processing result of the optical character recognition processing on the processing object image, the text data including a character recognition result for each of the plurality of unit recognition areas and a delimiter code added at the end of the character recognition result for each of the plurality of unit recognition areas, and the image forming apparatus has a communication part for transmitting the scan image to the electronic document generation apparatus, and the electronic document generation apparatus has an extraction part for extracting each of a plurality of line areas from a character area of the scan image received from the image forming apparatus, an image generation part for generating a recognition object image by performing an image processing on the scan image so that the each of the plurality of line areas should be determined by the cloud server as a unit recognition area, a transmitting part for transmitting the recognition object image to the cloud server as the processing object image for the optical character recognition processing, a receiving part for receiving the text data which is the processing result of the optical character recognition processing on the recognition object image, from the cloud server, and a document generation part for separating the text data into a plurality of character string data on the basis of the delimiter code included in the text data, determining a correspondence between the plurality of line areas and the plurality of character string data, and generating the electronic document by arranging each of the plurality of character string data in the line area corresponding to the character string data.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, the preferred embodiments of the present invention will be described with reference to figures.

1. The First Preferred Embodiment 1-1. Overall Configuration

Figure 1:
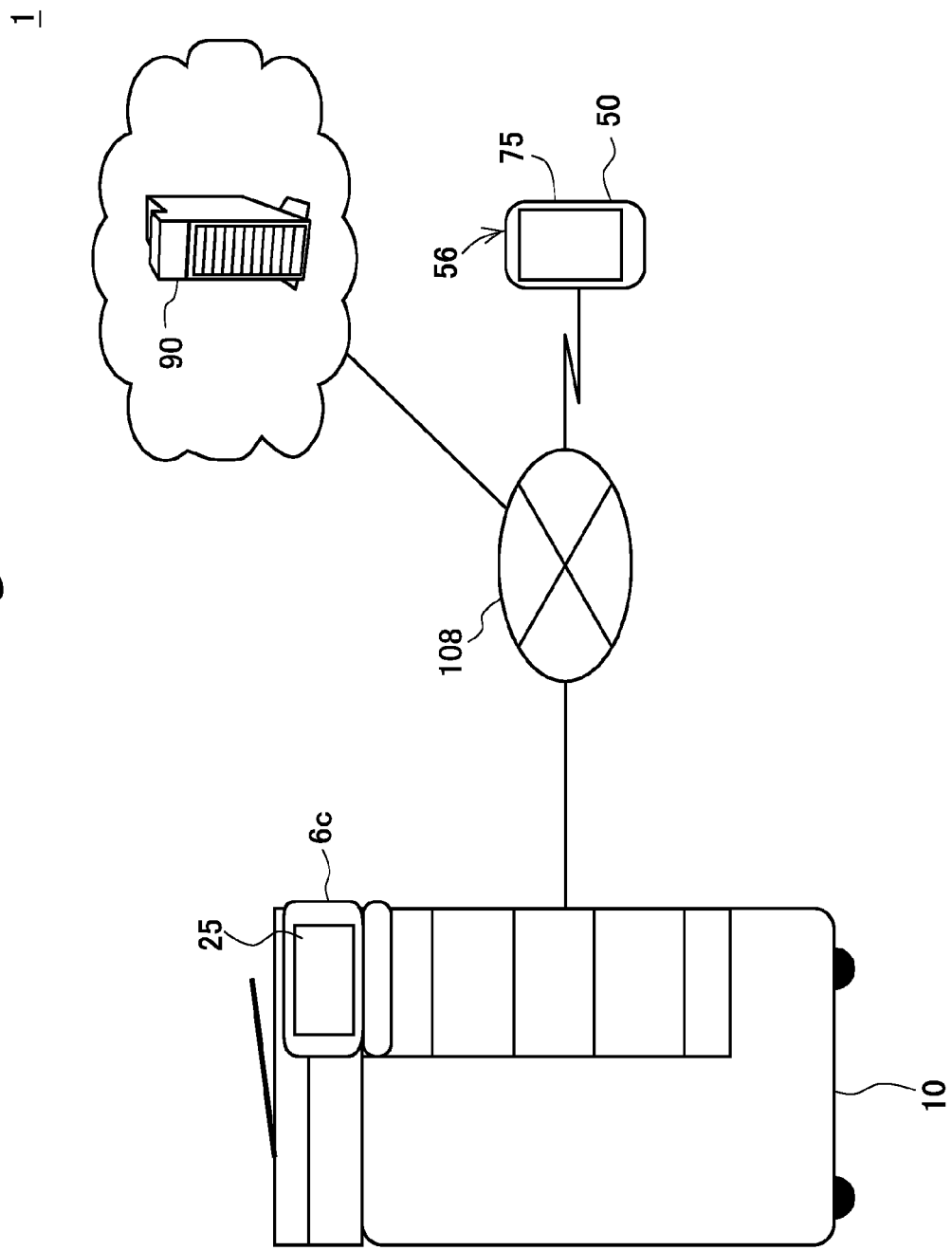
FIG. 1 is a view showing an electronic document generation system.

FIG. 1 is a view showing an image forming system 1 in accordance with the present invention. As shown in FIG. 1, the image forming system 1 comprises an image forming apparatus 10, an external terminal 50, and a cloud server 90.

The image forming apparatus 10, the external terminal 50, and the cloud server 90 are connected to one another via a network 108. The network 108 includes a LAN (Local Area Network), the internet, and the like. The connection to the network 108 may be wired or wireless. There is a case, for example, where the image forming apparatus 10 and the cloud server 90 are connected to the network 108 via wired communication and the external terminal 50 is connected to the network 108 via wireless communication.

The cloud server 90 is an external apparatus (external server) different from both the image forming apparatus 10 and the external terminal 50. The cloud server 90 is a server for providing a versatile OCR (Optical Character Recognition) processing service. The cloud server 90 does not provide a generation service for a searchable PDF (Portable Document Format) file. The searchable PDF file is generated by cooperation of the external terminal 50, the cloud server 90, and the like, as described later.

Further, the cloud server 90 separates a character area in a processing object image for the OCR processing into a plurality of unit recognition areas each of which can include an area larger than a line area for one line in accordance with a predetermined criterion for determination and performs the OCR processing on each of the plurality of unit recognition areas. Then, the cloud server 90 generates text data 550 (see FIG. 9) as an OCR processing result of the processing object image. The text data 550 includes a character recognition result (OCR processing result) for each of the plurality of unit recognition areas and a delimiter code (for example, line feed code (control code)) added at the end of the character recognition result for each unit recognition area. Further, the text data 550 is also referred to as a set of data (character code group data) consisting of character codes (including delimiter codes or the like).

Figure 5:
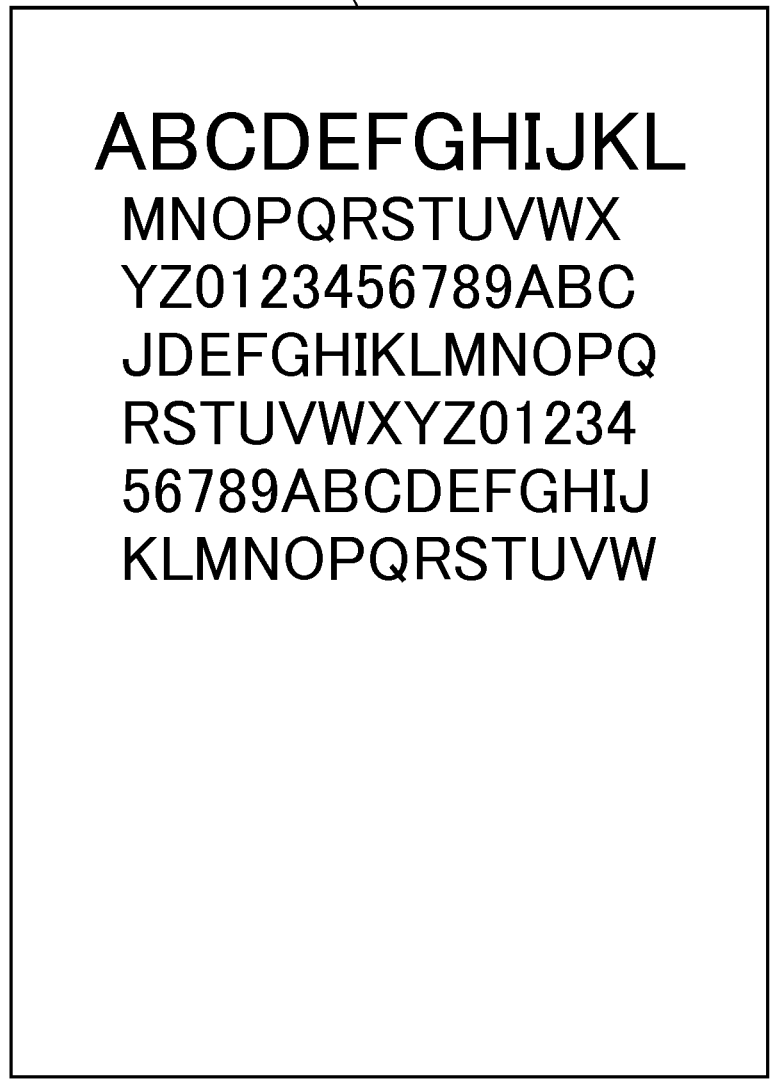
FIG. 5 is a view showing a scan image.

In the image forming system 1, a scan image 200 (see FIG. 5) of an original is generated by the image forming apparatus 10, and the scan image 200 is transmitted from the image forming apparatus 10 to the external terminal 50. The external terminal 50 performs an image generation processing (described later) on the scan image 200, to thereby generate a recognition object image 500 (see FIG. 8), and transmits the recognition object image 500 to the cloud server 90. The cloud server 90 performs an OCR processing on the recognition object image 500 received from the external terminal 50, to thereby generate the text data 550 as an OCR processing result, and transmits the text data 550 to the external terminal 50. Then, the external terminal 50 generates an electronic document 600 (see FIG. 10) on the basis of the text data 550 received from the cloud server 90. The electronic document 600 is generated as an electronic document with text data (herein, a searchable PDF file).

The image forming system 1 is also referred to as an electronic document generation system since the image forming system 1 is a system for generating an electronic document. Similarly, the external terminal 50 is also referred to as an "electronic document generation apparatus".

1-2. Constitution of Image Forming Apparatus

Figure 2:
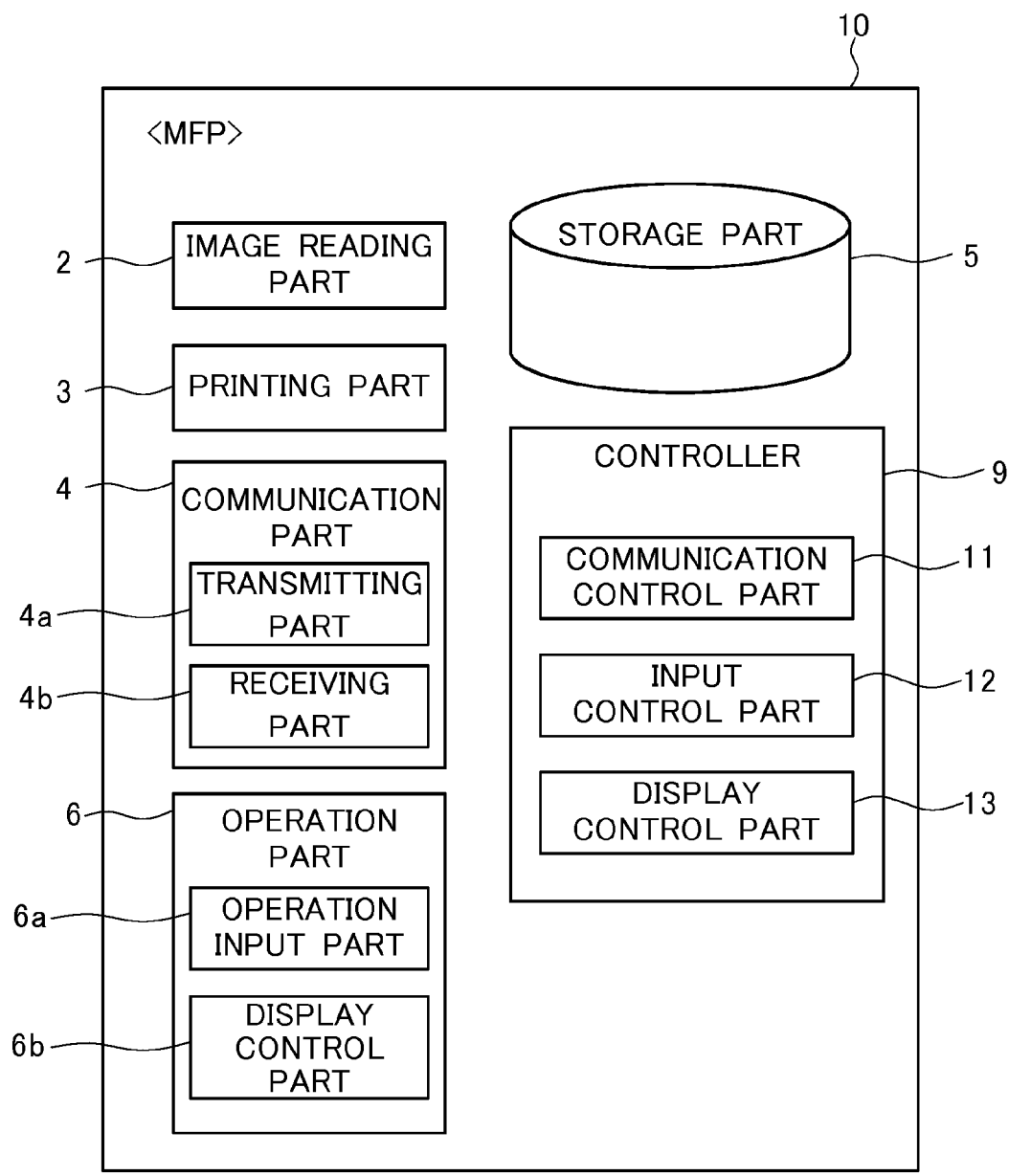
FIG. 2 is a view showing functional blocks of an image forming apparatus (MFP)

FIG. 2 is a view showing functional blocks of the image forming apparatus 10. Herein, as an example of the image forming apparatus 10, shown is an MFP (Multi-Functional Peripheral).

The MFP 10 is an apparatus (also referred to as a multifunction machine) having a scanner function, a copy function, a facsimile communication function, a box storage function, and the like. Specifically, as shown in the functional block diagram of FIG. 2, the MFP 10 comprises an image reading part 2, a printing part 3, a communication part 4, a storage part 5, an operation part 6, a controller 9, and the like and multiply operates these constituent parts to implement various functions.

The image reading part 2 is a processing part which optically reads an original (manuscript) placed on a predetermined position of the MFP 10 and generates image data (also referred to as a scan image) of the original.

The printing part 3 is an output part which prints out an image to various media such as paper on the basis of the data on an object to be printed.

The communication part 4 is a processing part capable of performing facsimile communication via public networks or the like. Further, the communication part 4 is capable of performing network communication via the network 108. The network communication uses various protocols such as TCP/IP (Transmission Control Protocol/Internet Protocol) and the like. By using the network communication, the MFP 10 can transmit and receive various data to/from desired partners (for example, the external terminal 50). The communication part 4 has a transmitting part 4a for transmitting various data and a receiving part 4b for receiving various data.

The storage part 5 is a storage unit such as a hard disk drive (HDD) or/and the like.

The operation part 6 comprises an operation input part 6a for receiving an operation input which is given to the MFP 10 and a display part 6b for displaying various information thereon.

The MFP 10 is provided with a substantially plate-like operation panel part 6c (see FIG. 1). The operation panel part 6c has a touch panel 25 (see FIG. 1) on a front surface side thereof. The touch panel 25 serves as part of the operation input part 6a and also serves as part of the display part 6b. The touch panel 25 is a liquid crystal display panel in which various sensors or the like are embedded, and capable of displaying various information thereon and receiving various operation inputs from an operator.

In the touch panel 25, for example, displayed are various operation screens (including button images and the like). By pressing buttons which are virtually arranged in the operation screen of the touch panel 25, the operator can set various operations of the MFP 10 and give operation instructions.

The controller 9 is a control unit for generally controlling the MFP 10. The controller 9 is a computer system which is embedded in the MFP 10 and comprises a CPU, various semiconductor memories (RAM and ROM), and the like. The controller 9 causes the CPU to execute a predetermined software program (hereinafter, referred to simply as a program) P1 stored in the ROM (e.g., EEPROM), to thereby implement various processing parts. Further, the program (in more detail, program module group) P1 may be recorded in various portable recording media (in other words, various non-transitory computer-readable recording media) such as a USB memory or the like and read out from the recording medium to be installed in the MFP 10. Alternatively, the program may be downloaded via the network 108 or the like to be installed in the MFP 10.

Specifically, as shown in FIG. 2, the controller 9 executes the program P1, to thereby implement various processing parts including a communication control part 11, an input control part 12, and a display control part 13.

The communication control part 11 is a processing part for controlling a communication with other apparatus(es) (the external terminal 50 or/and the like) in cooperation with the communication part 4 and the like. For example, the communication control part 11 transmits the scan image 200 or the like to the external terminal 50.

The input control part 12 is a control part for controlling a receiving operation of the operation input on the operation input part 6a from the user, and the like.

The display control part 13 is a processing part for controlling a display operation in the display part 6b. The display control part 13 displays the operation screen to be used for operating the MFP 10 on the touch panel 25.

1-3. Constitution of External Terminal

Next, a constitution of the external terminal 50 will be described.

The external terminal 50 is an information input/output terminal device (also referred to as an information terminal or a communication terminal), which is capable of performing network communication with the MFP 10 and the cloud server 90. Herein, as an example of the external terminal 50, shown is a tablet terminal. The external terminal 50, however, is not limited to this but may be a smartphone, a personal computer, or the like. Further, the external terminal 50 may be a portable device (portable information terminal or the like) (portable terminal) or a stationary device.

Figure 3:
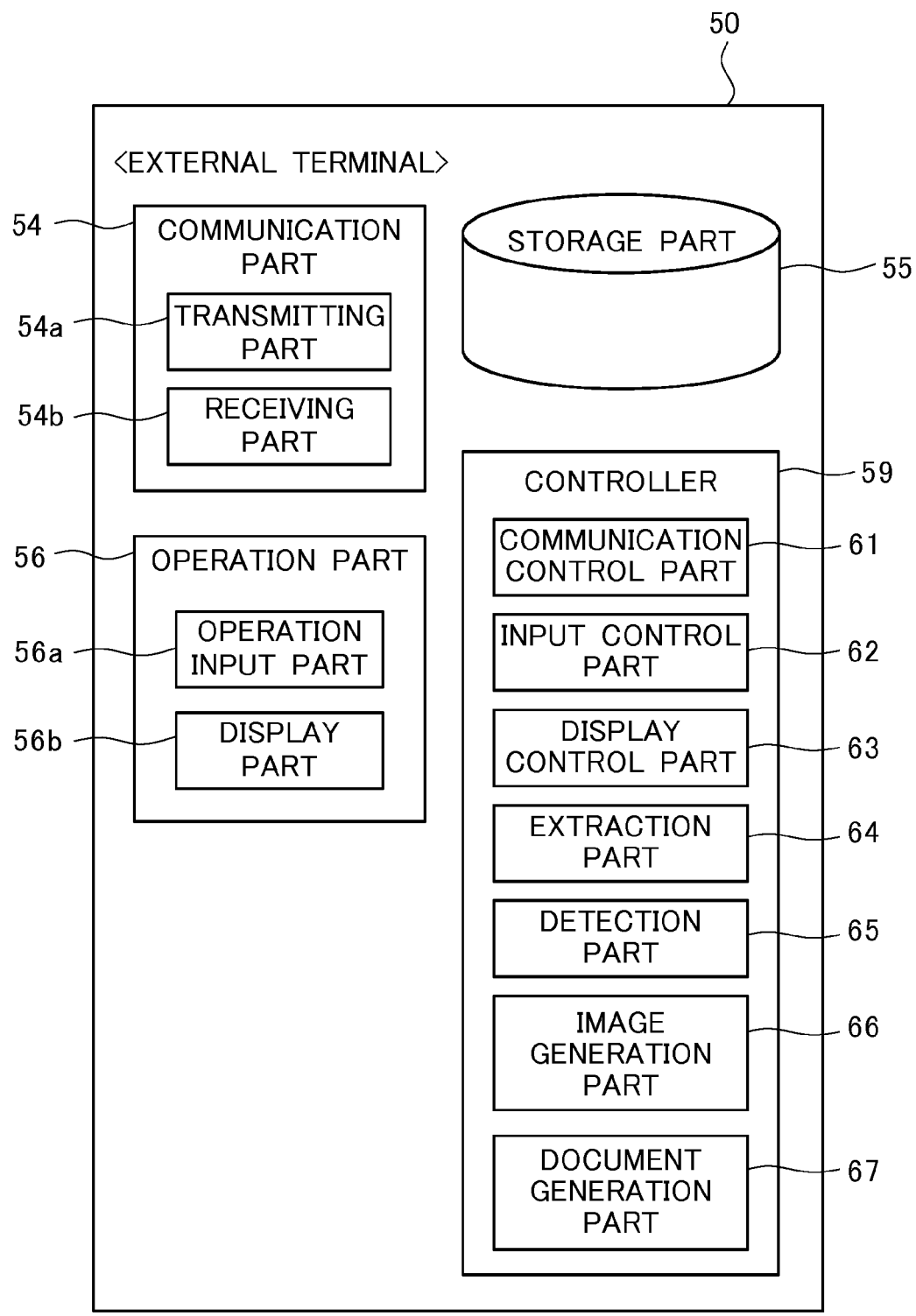
FIG. 3 is a functional block diagram showing a schematic constitution of an external terminal.

FIG. 3 is a functional block diagram showing a schematic constitution of the external terminal 50.

As shown in the functional block diagram of FIG. 3, the external terminal 50 comprises a communication part 54, a storage part 55, an operation part 56, a controller 59, and the like and multiply operates these constituent parts to implement various functions.

The communication part 54 is capable of performing network communication via the network 108. The network communication uses various protocols such as TCP/IP (Transmission Control Protocol/Internet Protocol) and the like. By using the network communication, the external terminal 50 can transmit and receive various data to/from desired partners (the MFP 10, the cloud server 90, or/and the like). The communication part 54 has a transmitting part 54a for transmitting various data and a receiving part 54b for receiving various data. For example, the receiving part 54b receives the scan image 200 from the MFP 10 and the transmitting part 54a transmits the recognition object image 500 (described later) to the cloud server 90. Further, the receiving part 54b receives the OCR processing result (text data) for the recognition object image 500 or the like from the cloud server 90.

The storage part 55 is a storage unit such as a nonvolatile semiconductor memory or the like, and stores various information. In the storage part 55, stored are respective coordinate positions of a plurality of line areas 400 (see FIG. 6) in the scan image 200, which are extracted from a character area 300 (see FIG. 6) of the scan image 200.

The operation part 56 comprises an operation input part 56a for receiving an operation input which is given to the external terminal 50 and a display part 56b for displaying various information thereon. The external terminal 50 is provided with a touch panel 75 (see FIG. 1) which is a liquid crystal display panel in which various sensors or the like are embedded. Specifically, as shown in FIG. 1, the touch panel 75 is provided almost entirely on a front surface side of the substantially plate-like external terminal 50, except a peripheral portion (frame portion) thereof. In other words, the touch panel 75 serves as part of the operation input part 56a and also serves as part of the display part 56b.

The controller 59 is a control unit for generally controlling the external terminal 50. The controller 59 is a computer system which is embedded in the external terminal 50 and comprises a CPU, various semiconductor memories (RAM and ROM), and the like. The controller 59 causes the CPU to execute a predetermined software program (hereinafter, referred to simply as a program) P2 stored in a storage part (semiconductor memory or the like), to thereby implement various processing parts. Further, the program (in more detail, program module group) P2 may be recorded in various portable recording media (in other words, various non-transitory computer-readable recording media) such as a USB memory or the like and read out from the recording medium to be installed in the external terminal 50. Alternatively, the program may be downloaded via the network 108 or the like to be installed in the external terminal 50.

Specifically, the controller 59 executes the program P2 or the like, to thereby implement various processing parts including a communication control part 61, an input control part 62, a display control part 63, an extraction part 64, a detection part 65, an image generation part 66, and a document generation part 67.

The communication control part 61 is a processing part for controlling a communication with the MFP 10, the cloud server 90, or/and the like in cooperation with the communication part 54 and the like.

The input control part 62 is a control part for controlling a receiving operation of the operation input on the operation input part 56a from the user, and the like.

The display control part 63 is a processing part for controlling a display operation in the display part 56b. The display control part 63 displays the operation screen to be used for cooperation with the MFP 10 on the touch panel 75.

The extraction part 64 is a processing part for extracting each of the plurality of line areas 400 (see FIG. 6) from the character area 300 of the scan image 200.

The detection part 65 is a processing part for detecting a position (coordinate position) of each of the plurality of line areas 400 in the scan image 200.

The image generation part 66 is a processing part for performing an image generation processing (described later) on the scan image 200, to thereby generate the recognition object image 500, so that each of the plurality of line areas 400 can be determined by the cloud server 90 as a unit recognition area.

Figure 9:
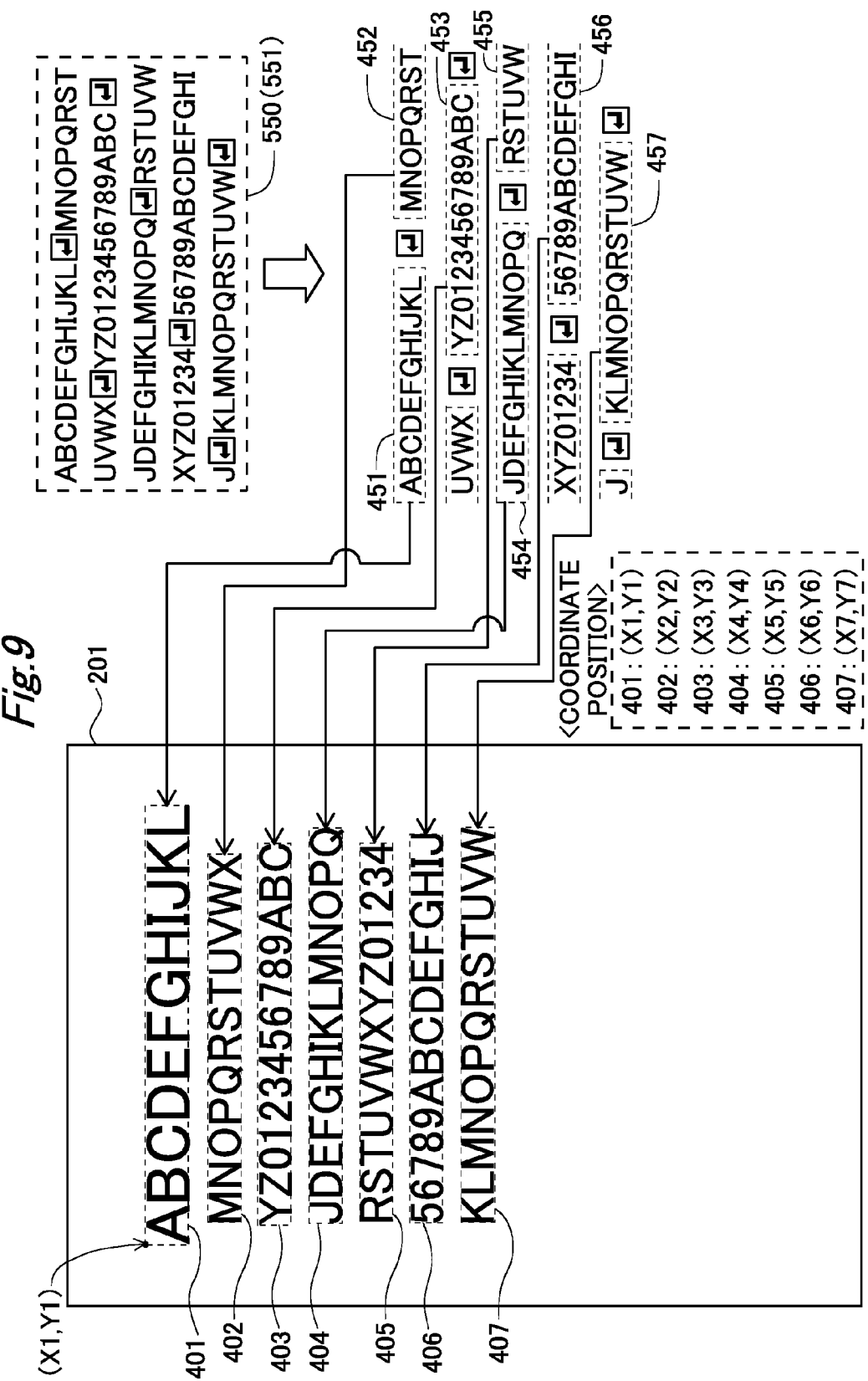
FIG. 9 is a view showing a manner in which character string data are arranged in the respective corresponding line areas.
Figure 10:
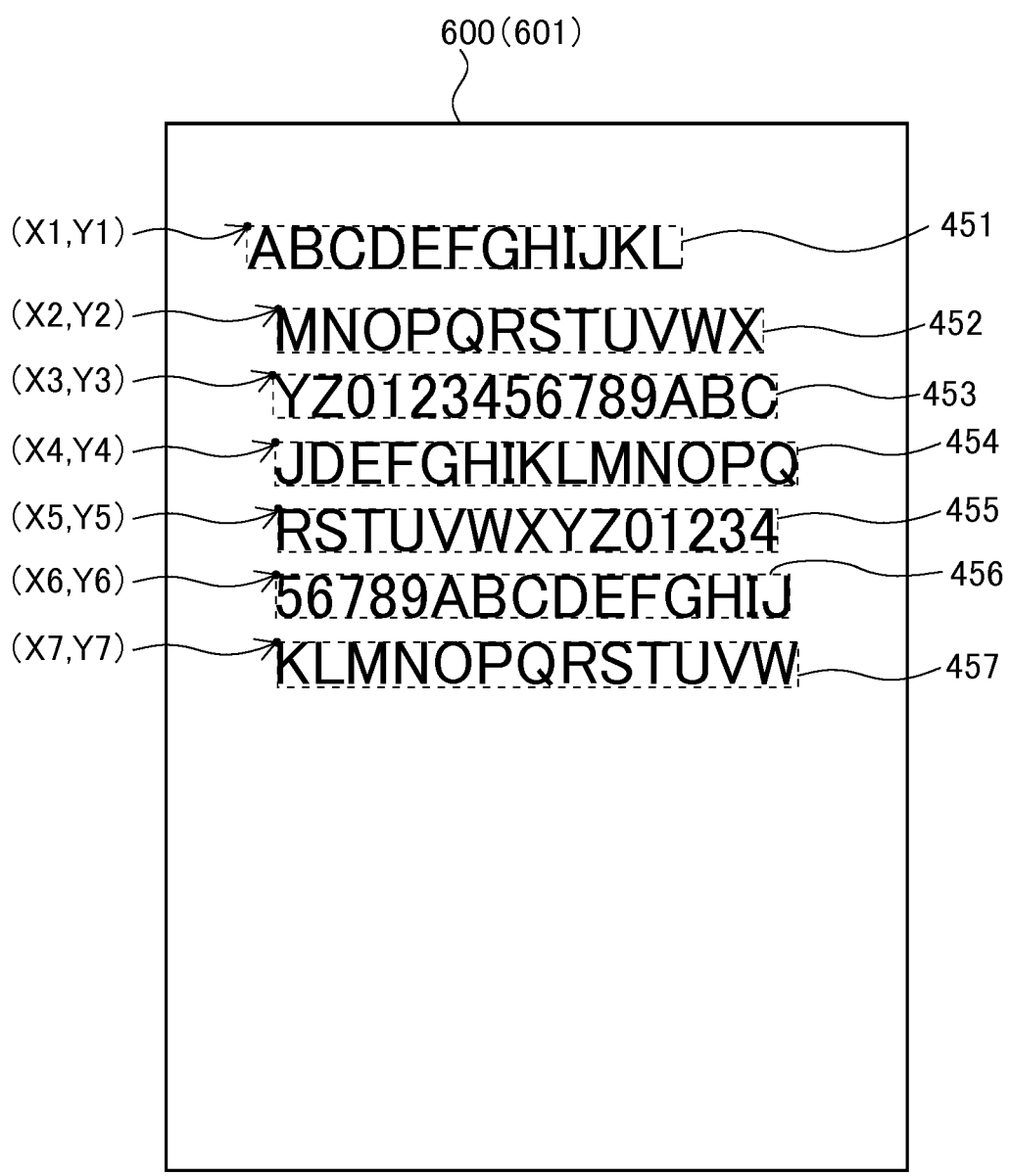
FIG. 10 is a view showing a searchable PDF file which is generated.

The document generation part 67 is a processing part for generating the electronic document 600 (see FIG. 10). The document generation part 67 separates the text data 550 into a plurality of character string data (451 to 457 or the like) (see FIG. 9) on the basis of the delimiter codes included in the text data 550 received from the cloud server 90, and determines a correspondence between the plurality of line areas 400 in the scan image 200 and the plurality of character string data (451 to 457 or the like). The document generation part 67 arranges the character string data (451 to 457 or the like) in the corresponding line areas 400, respectively, to thereby generate the electronic document 600 (searchable PDF file or the like).

1-4. Operation

In the image forming system 1, as described above, the external terminal 50 performs an "image generation processing" on the scan image 200 to generate the recognition object image 500, and transmits the recognition object image 500 to the cloud server 90.

In the first preferred embodiment, the cloud server 90 determines (recognizes) a unit recognition area on the basis of a separation interval between each of the plurality of line areas and another line area adjacent thereof in the processing object image for the OCR processing. Specifically, when a separation interval between a line area and the next line area is relatively small (in more detail, the separation interval is smaller than the height of the line area), the cloud server 90 does not distinguish the line area from the next line area. Then, the cloud server 90 generates text data in which the character recognition result (OCR processing result) of the line area is continuous with the character recognition result of the next line area. On the other hand, when a separation interval between a line area and the next line area in the processing object image is relatively large (in more detail, the separation interval is larger than the height of the line area), the cloud server 90 determines one or more line areas until the line area and one or more line areas from the next line area in the processing object image, as the unit recognition areas, respectively. Then, the cloud server 90 generates text data 550 in which a delimiter code (herein, a line feed code) is added at the end of the character recognition result for each unit recognition area. On the basis of such a criterion for determination, the cloud server 90 separates the character area in the processing object image into a plurality of unit recognition areas.

Further, in the first preferred embodiment, the external terminal 50 performs a processing in which the mutual separation intervals between the plurality of line areas 400 in the scan image 200 are set to each have a size not smaller than the height (the highest height H) of the tallest one of the plurality of line areas 400, as an "image generation processing". By performing such an "image generation processing", the external terminal 50 (intentionally) causes the cloud server 90 to determine the plurality of line areas 400 as unit recognition areas different from one another, and acquires a desired processing result (the text data 550 in which the delimiter code is added at the end of the character recognition result for each line area 400) from the cloud server 90.

Herein, it is assumed that a determination method (a criterion for determination of the unit recognition area) used to determine the unit recognition area by the cloud server 90 is well known. In more detail, it is assumed that a program designer or the like knows the determination method from publication or the like of the specification of the OCR processing by the cloud server 90 and creates a program on the "image generation processing" in accordance with the determination method, and the program is incorporated in the external terminal 50.

Generation of Scan Image, Etc.

First, a user places an original (manuscript) to be scanned on an original platen (for example, an ADF (Auto Document Feeder), an original platen glass surface, or the like) of the MFP 10 and gives a generation instruction for an electronic document 600 (601) to the external terminal 50 by using the operation screen of the external terminal 50. When the external terminal 50 receives the generation instruction, the external terminal 50 transmits a scan image generation instruction based on the generation instruction to the MFP 10.

In giving the generation instruction for the electronic document 600 (601), the user specifies a file format of the electronic document 600 (601) to be finally generated by a scan operation. Herein, as the file format of the electronic document 601, it is assumed that a searchable PDF file (a PDF file with transparent text) is specified. The searchable PDF file (PDF file with transparent text) is an electronic document of PDF format having an image layer with a character image and a text layer in which a character recognition result (text data) for the character image is embedded in a non-display state.

When the MFP 10 receives the generation instruction (scan image generation instruction or the like) from the external terminal 50, the MFP 10 starts the scan operation, to thereby generate the scan image 200 (201) (see FIG. 5) of the original placed on the original platen (ADF or the like) of the MFP 10.

Then, the MFP 10 transmits the scan image (in more detail, scan image data) 201 to the external terminal 50.

OCR processing and Electronic Document Generation Processing, Etc.

Figure 4:
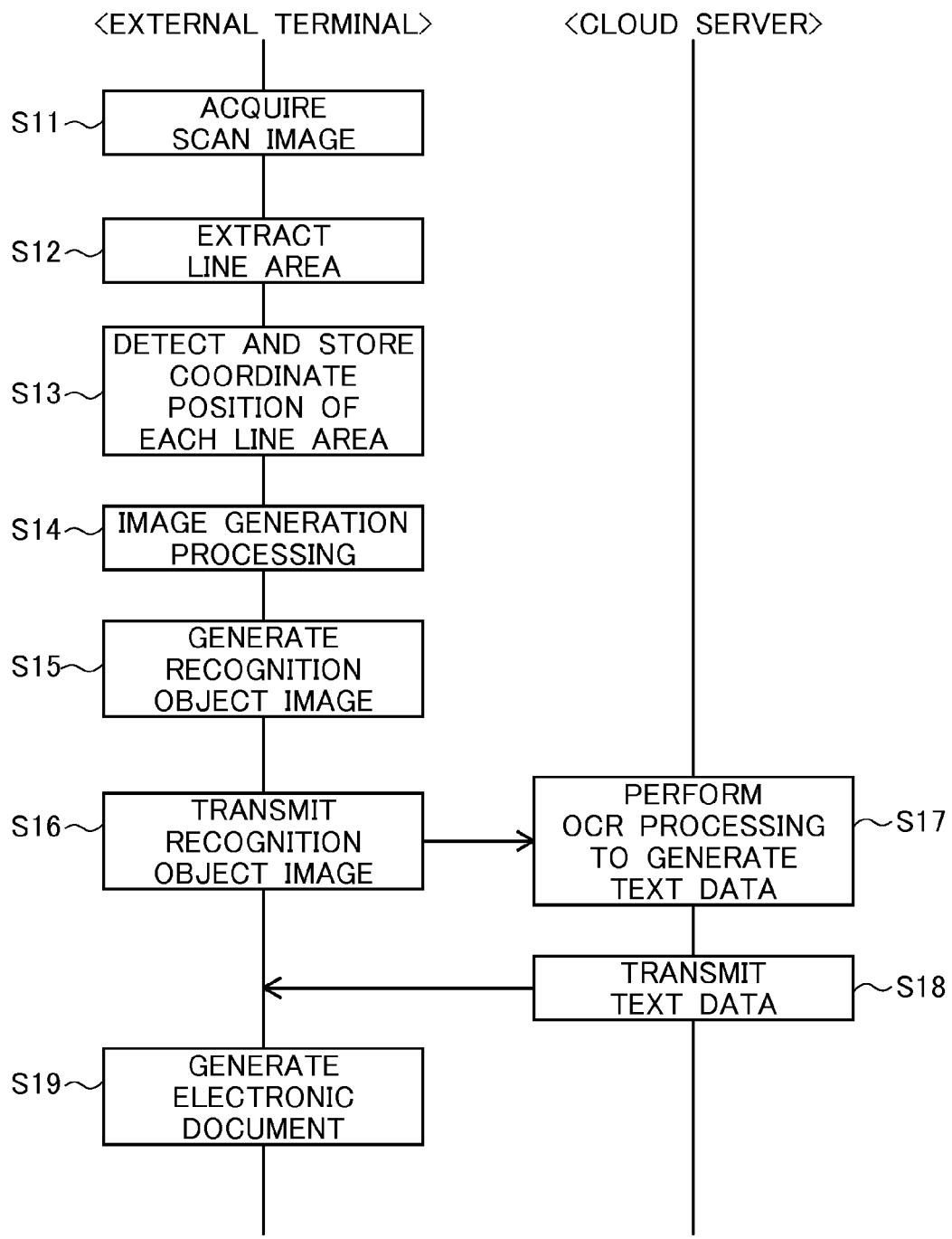
FIG. 4 is a timing chart showing an exemplary operation of the electronic document generation system.

FIG. 4 is a timing chart showing an exemplary operation of the electronic document generation system 1. When the external terminal 50 (and the cloud server 90) receives the scan image 200 (201) from the MFP 10, the external terminal 50 (and the cloud server 90) executes the process steps shown in FIG. 4.

Figure 6:
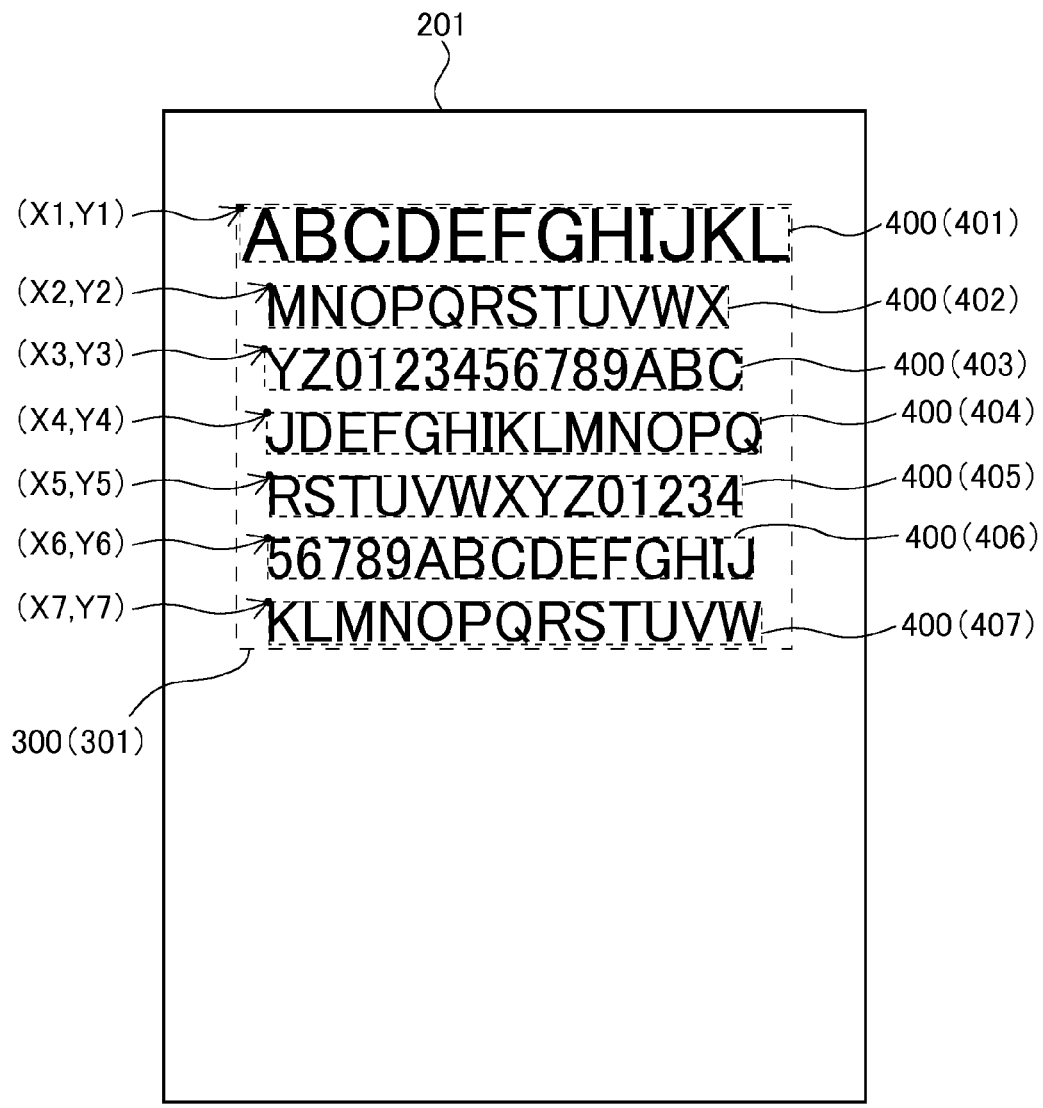
FIG. 6 is a view showing line areas and respective coordinate positions thereof.

The external terminal 50 receives and acquires the scan image 201 (see FIG. 5) from the MFP 10. As shown in FIG. 6, the external terminal 50 extracts a plurality of line areas (401 to 407) from the character area 300 (301) of the scan image 201 (Step S12). Specifically, the external terminal 50 (the extraction part 64) performs an image processing to separate the scan image 201 into the character area 301 and a non-character area and extract the line areas (each of which is an area of one line unit) 401 to 407.

After the line areas 401 to 407 are extracted, the external terminal 50 (the detection part 65) detects respective positions (coordinate positions) of the line areas 401 to 407 in the scan image 201 (see FIG. 6) and stores the coordinate positions into the storage part 55 (Step S13). Herein, as shown in FIG. 6, a coordinate position of the upper-left end of each of the line areas 401 to 407 in the scan image 201 is detected, the respective coordinate positions (coordinate values (X1, Y1) to (X7, Y7)) of the line areas 401 to 407 are stored in the storage part 55.

Then, the external terminal 50 (the image generation part 66) performs an image generation processing (described below) on the scan image 201 so that each of the plurality of line areas (line areas 401 to 407) can be determined by the cloud server 90 as a unit recognition area (Step S14), to thereby generate a recognition object image 501 (501A) (FIG. 8) (Step S15).

Specifically, the image generation part 66 performs an image processing to detect the respective heights H1 to H7 (FIG. 7) of the line areas 401 to 407 in the scan image 201, to thereby determine the height (highest height H) of the tallest one of the line areas 401 to 407. Herein, among the heights H1 to H7 of the line areas 401 to 407, the height H1 of the line area 401 is determined as the highest height H. Then, the image generation part 66 sets the mutual separation intervals between the line areas 401 to 407 to each have a size H10 (=H+ΔH) obtained by adding a predetermined value ΔH (e.g., 2 mm) to the highest height H, respectively. The image generation part 66 performs such a processing (image processing) on the scan image 201 as the "image generation processing" (Step S14), to thereby generate the recognition object image 501A (Step S15). Herein, as shown in FIG. 8, the mutual separation intervals between the line areas 401 to 407 are set to each have a size H11 (=H1+ΔH) obtained by adding a predetermined value ΔH to the highest height (the height of the line area 401) H1, to thereby generate the recognition object image 501A. In other words, generated is the recognition object image 501A in which the line areas 401 to 407 are arranged with a space having the size H11 (=H1+ΔH) not smaller than the highest height H1 therebetween.

Then, the external terminal 50 (the transmitting part 54*a*) transmits the recognition object image 501A to the cloud server 90 as the processing object image for the OCR processing (Step S16). Further, the external terminal 50 transmits an OCR start instruction indicating that the OCR processing should be started on the recognition object image 501A to the cloud server 90, as well as the recognition object image 501A.

When the cloud server 90 receives the recognition object image 501A and the OCR start instruction from the external terminal 50, the cloud server 90 recognizes the recognition object image 501A as a processing object image for the OCR processing and performs the OCR processing on the recognition object image 501A, to thereby generate text data 551 (Step S17).

Specifically, the cloud server 90 determines the line areas 401 to 407 as different unit recognition areas on the basis of that the mutual separation intervals between the line areas 401 to 407 in the recognition object image 501A each have the size H11 (=H1+ΔH) not smaller than the highest height H1 (in other words, that each separation interval is larger than the height of each of the line areas 401 to 407). Then, the cloud server 90 performs the OCR processing on the recognition object image 501A, to thereby generate the text data 551 (the upper-right portion of FIG. 9) as the OCR processing result for the recognition object image 501A. As shown in the upper-right portion of FIG. 9, the text data 551 includes the respective character recognition results (OCR processing results) for the line areas 401 to 407, and the delimiter code (herein, the line feed code) is added at the end of the character recognition result (OCR processing result) for each of the line areas 401 to 407. In other words, the text data 551 includes the respective character recognition results (text data) for the line areas 401 to 407 and seven line feed codes.

After that, the cloud server 90 transmits the text data (OCR processing result for the recognition object image 501A) 551 to the external terminal 50 (Step S18).

When the external terminal 50 (the document generation part 67) receives the text data 551 from the cloud server 90, the external terminal 50 (the document generation part 67) arranges the character string data 451 to 457 (described below) in the corresponding line areas 401 to 407, respectively, on the basis of the respective detection positions (coordinate positions) of the line areas 401 to 407 in the scan image 201, to thereby generate the electronic document 600 (601) (FIG. 10) (Step S19).

Specifically, as shown in FIG. 9, the document generation part 67 separates the text data 551 into seven pieces of character string data 451 to 457 on the basis of the seven line feed codes included in the text data 551. Then, the document generation part 67 determines the first character string data 451 as the character string data corresponding to the line area 401 for the first line in the scan image 201 and arranges the character string data 451 in the detection position (coordinate position (X1, Y1)) of the line area 401. In other words, the document generation part 67 associates the first character string data 451 with the line area 401 for the first line and arranges the character string data 451 in the detection position of the line area 401. Similarly, the document generation part 67 associates the character string data 452 to 457 with the line areas 402 to 407, respectively, and arranges the character string data 452 to 457 in the detection positions (coordinate positions) of the line areas 402 to 407, respectively, (see FIG. 9).

Then, after all the character string data 451 to 457 are arranged in all the line areas 401 to 407, the document generation part 67 generates a searchable PDF file (PDF file with transparent text) as the electronic document 601 (see FIG. 10). As shown in FIG. 10, in the electronic document 601 (searchable PDF file), the character string data 451 to 457 are embedded as the transparent text data (in a non-display state) in the coordinate positions of the line areas 401 to 407, respectively. Further, in FIG. 10, for convenience of illustration, though the respective character images of the line areas 401 to 407 are not displayed but the OCR processing results (character string data 451 to 457) are displayed, in an actual case, the character string data 451 to 457 are not displayed but the respective character images of the line areas 401 to 407 are displayed in the electronic document 601.

Thus, the document generation part 67 separates the text data 551 into the character string data 451 to 457 on the basis of the delimiter codes (herein, the line feed codes) included in the text data 551, and determines the correspondence between the line areas 401 to 407 and the character string data 451 to 457. Then, the document generation part 67 arranges the character string data 451 to 457 in the detection positions of the corresponding line areas 401 to 407, respectively, to thereby generate the electronic document 601.

As above described, in the operation of the first preferred embodiment, the line areas 401 to 407 are extracted from the scan image 201, and the image generation processing is performed so that the line areas 401 to 407 can be determined by the cloud server 90 as the unit recognition areas, to thereby generate the recognition object image 501. Then, in the cloud server 90, the line areas 401 to 407 are determined as the unit recognition areas, respectively, and the delimiter codes are added at the end of the character recognition results for the line areas 401 to 407, respectively, to thereby generate the text data 551. Therefore, since the external terminal 50 can associate the line areas 401 to 407 in the scan image 201 with the respective character recognition results (character string data 451 to 457) for the line areas 401 to 407 on the basis of the delimiter codes, it is possible to generate the electronic document 601 in which the OCR processing results (text data) are arranged in the proper positions of the scan image 201.

Further, since the respective positions (coordinate positions) of the line areas 401 to 407 in the scan image 201 are detected and the character string data 451 to 457 are arranged to the detection positions of the corresponding line areas 401 to 407, respectively, it is possible to generate the electronic document 601 in which the OCR processing results (text data) are arranged in the more proper positions of the scan image 201.

Furthermore, though the processing in which the mutual separation intervals between the plurality of line areas are set to each have the size H10 not smaller than the highest height H is performed as the "image generation processing" in the first preferred embodiment, the present invention is not limited to this. For example, the processing in which a separation interval between each line area and the next line area thereof is set to have a size H20 not smaller than the height of the line area may be performed as the "image generation processing".

Figure 7:
FIG. 7 is a view showing respective heights of the line areas.
Figure 8:
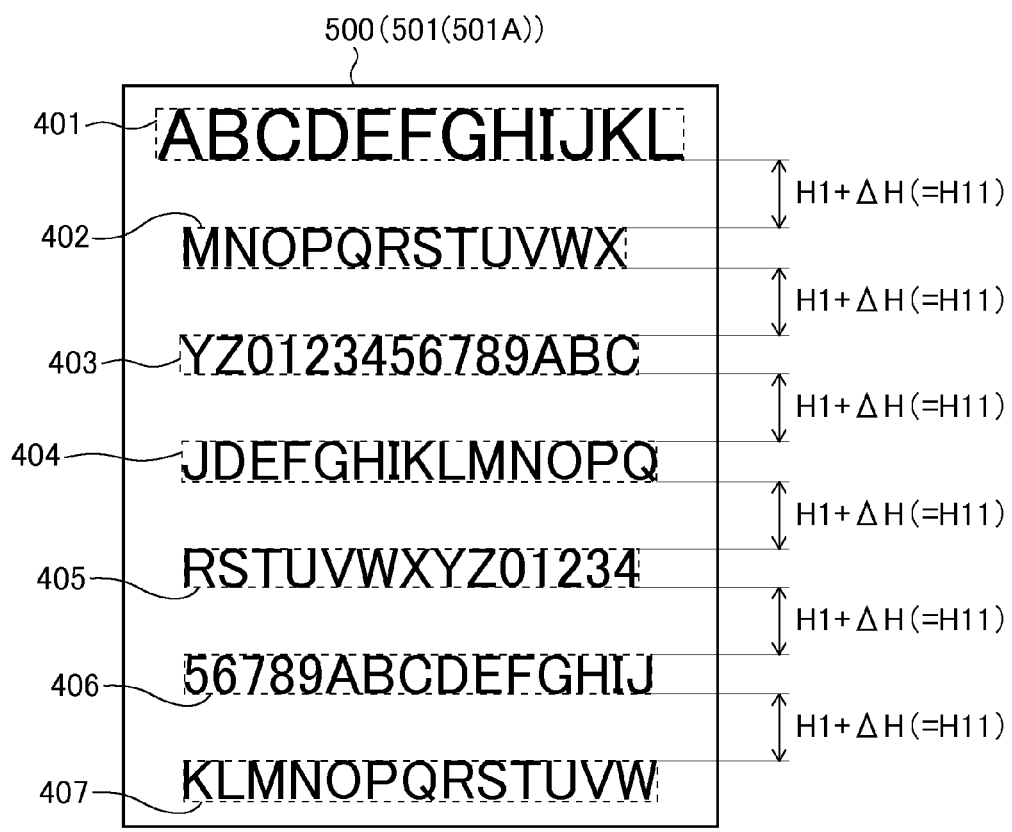
FIG. 8 is a view showing a processing object image.
Figure 11:
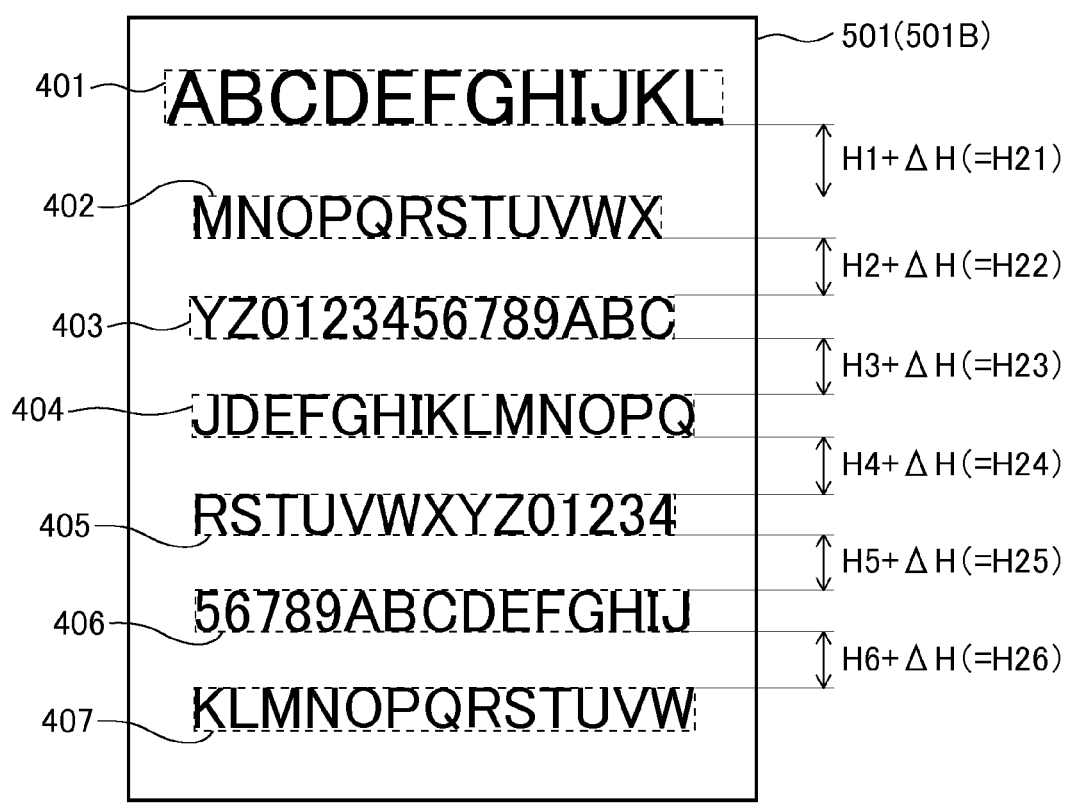
FIG. 11 is a view showing a processing object image in accordance with a variation of a first preferred embodiment.

Specifically, the image generation part 66 detects the respective heights H1 to H7 of the line areas 401 to 407 in the scan image 201 (see FIG. 7). Then, as shown in FIG. 11, the image generation part 66 sets a separation interval between the line area 401 and the next line area 402 to have a size H21 (=H1+ΔH) which is not smaller than the height H1. Further, the image generation part 66 sets a separation interval between the line area 402 and the next line area 403 to have a size H22 (=H2+ΔH) which is not smaller than the height H2. Similarly, the image generation part 66 sets the respective separation intervals between the line areas 403 to 406 and the next line area 404 to 407 to have sizes H23 to H26 (Hi+ΔH) (i=3, . . . , 6) which are not smaller than the heights H3 to H6, respectively. In other words, the image generation part 66 sets the separation intervals between the line areas 401 to 406 other than the last line among the line areas 401 to 407 and the next line areas 402 to 407 to have sizes H21 to H26 which are not smaller than the heights H1 to H6 of the line areas 401 to 406, respectively. Then, the image generation part 66 performs such an image generation processing to generate the recognition object image 501 (501B) (FIG. 11).

Further, also in this variation, as described above, when a separation interval between a line area and the next line area in the processing object image is larger than the height of the line area, the cloud server 90 determines one or more line areas until the line area and one or more line areas from the next line area in the processing object image, as the unit recognition areas, respectively.

Then, in the image generation processing in accordance with the above variation, since the separation interval between each line area and the next line area is set to have a size not smaller than the height of the line area, the line areas are determined by the cloud server 90 as different unit recognition areas, respectively.

2. The Second Preferred Embodiment

The second preferred embodiment is a variation of the first preferred embodiment. Hereinafter, description will be centered on the difference between the first and second preferred embodiments.

In the first preferred embodiment, when the separation interval between a line area and the next line area in the processing object image is larger than the height of the line area, the cloud server 90 determines one or more line areas until the line area and one or more line areas from the next line area, as the unit recognition areas, respectively. Further, in the first preferred embodiment, the external terminal 50 performs the processing in which the mutual separation intervals between the plurality of line areas 400 in the scan image 200 are set to each have a size not smaller than the height (the highest height H) of the tallest one of the plurality of line areas 400, as the "image generation processing".

The present invention, however, is not limited to this. For example, the cloud server 90 can determine the unit recognition area on the basis of other various criteria for determination (determination methods), and the external terminal 50 can perform an "image generation processing" in accordance with each of the determination methods on the scan image 200. In the following second to sixth preferred embodiments, such various aspects of the present invention will be shown.

In the second preferred embodiment, the cloud server 90 determines (recognizes) a unit recognition area on the basis of a delimiter line in the processing object image for the OCR processing. Specifically, when there is a delimiter line in the processing object image, the cloud server 90 determines areas separated by the delimiter line (one or more line areas above the delimiter line and one or more line areas below the delimiter line) as the unit recognition areas, respectively. Then, the cloud server 90 generates the text data 550 in which the delimiter code is added at the end of the character recognition result for each unit recognition area. On the basis of such a criterion for determination, the cloud server 90 separates the character area in the processing object image into a plurality of unit recognition areas.

Further, in the second preferred embodiment, the external terminal 50 performs a processing in which a delimiter line L (FIG. 12) is added to each of mutual line space areas between the plurality of line areas 400 in the scan image 200, as an "image generation processing". By performing such an "image generation processing", the external terminal 50 (intentionally) causes the cloud server 90 to determine the plurality of line areas 400 as unit recognition areas different from one another, and acquires a desired processing result (the text data 550 in which the delimiter code is added at the end of the character recognition result for each line area 400) from the cloud server 90.

Also in the second preferred embodiment, the process steps shown in FIG. 4 are performed, like in the first preferred embodiment.

The detailed processing in the image generation processing (Step S14) in the second preferred embodiment, however, is different from that in the image generation processing (Step S14) in the first preferred embodiment.

Figure 12:
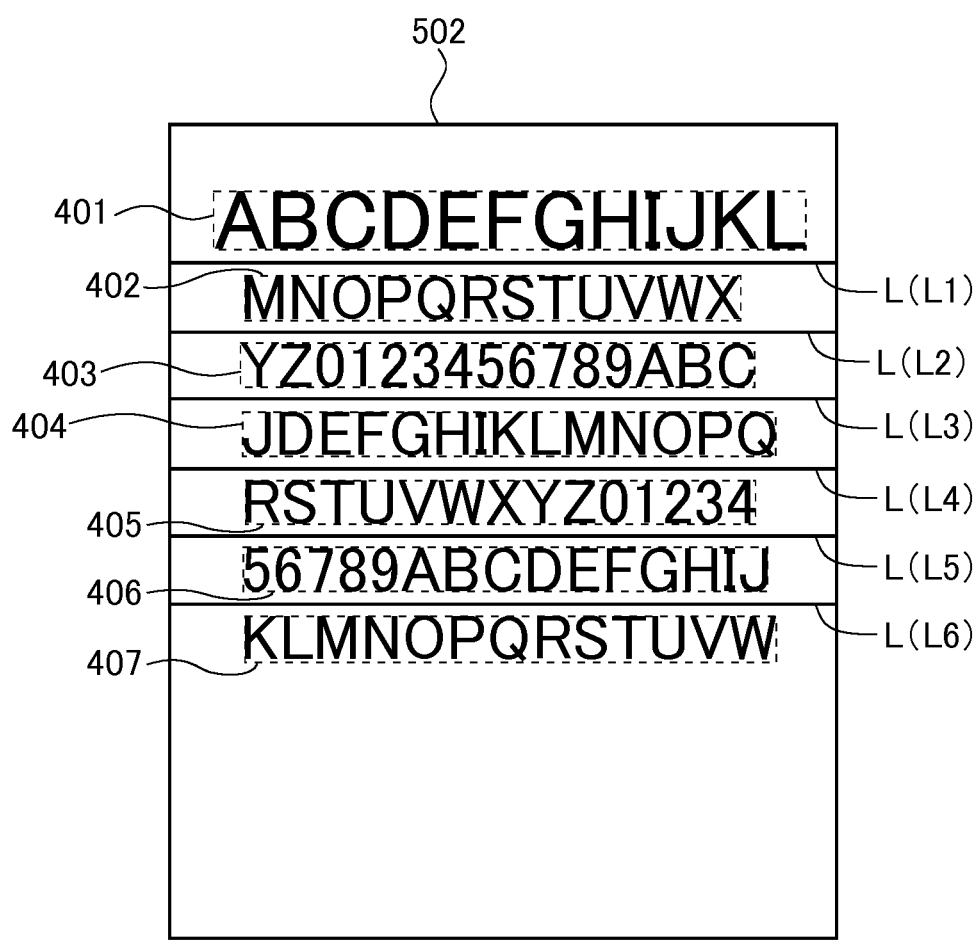
FIG. 12 is a view showing a processing object image in accordance with a second preferred embodiment.

Specifically, as shown in FIG. 12, the external terminal 50 (the image generation part 66) performs a processing (an image processing) in which delimiter lines L (L1 to L6) are added to the mutual line space areas between the line areas 401 to 407 in the scan image 201, respectively, on the scan image 201 as an "image generation processing" (Step S14), to thereby generate a recognition object image 502 (Step S15). Herein, the delimiter lines L (L1 to L6) are each added over the entire width of the recognition object image 500 (502) in a horizontal direction.

Further, the detailed processing in Step S17 in the second preferred embodiment is different from that in Step S17 in the first preferred embodiment.

Specifically, the cloud server 90 determines the line areas 401 to 407 in the recognition object image 502 as the unit recognition areas different from one another on the basis of the delimiter lines L1 to L6 in the recognition object image 502 which is received from the external terminal 50. Then, the cloud server 90 performs the OCR processing on the recognition object image 502, to thereby generate the text data 551 (FIG. 9) in which the delimiter codes are added at the end of the character recognition results for the line areas 401 to 407, respectively, as an OCR processing result for the recognition object image 502 (Step S17).

The process steps other than those in Steps S14 and S17 are performed like in the first preferred embodiment.

According to the present preferred embodiment, the same effect as that in the first preferred embodiment can be achieved.

3. The Third Preferred Embodiment

The third preferred embodiment is a variation of the first preferred embodiment. Hereinafter, description will be centered on the difference between the first and third preferred embodiments.

In the third preferred embodiment, the cloud server 90 determines (recognizes) a unit recognition area on the basis of an end identification image (an image indicating the end of the unit recognition area) in the processing object image for the OCR processing. Specifically, when there is an end identification image in a line area in the processing object image, the cloud server 90 determines one or more line areas until the line area and one or more line areas from the next line area as the unit recognition areas, respectively. Then, the cloud server 90 generates the text data 550 in which the delimiter code is added at the end of the character recognition result for each unit recognition area. On the basis of such a criterion for determination, the cloud server 90 separates the character area in the processing object image into a plurality of unit recognition areas.

Further, in the third preferred embodiment, the external terminal 50 performs a processing in which an end identification image 430 (FIG. 13) is added at the end of each of the plurality of line areas 400 in the scan image 200, as an "image generation processing". By performing such an "image generation processing", the external terminal 50 (intentionally) causes the cloud server 90 to determine the plurality of line areas 400 as unit recognition areas different from one another, and acquires a desired processing result (the text data 550 in which the delimiter code is added at the end of the character recognition result for each line area 400) from the cloud server 90.

Also in the third preferred embodiment, the process steps shown in FIG. 4 are performed, like in the first preferred embodiment.

The detailed processing in the image generation processing (Step S14) in the third preferred embodiment, however, is different from that in the image generation processing (Step S14) in the first preferred embodiment.

Figure 13:
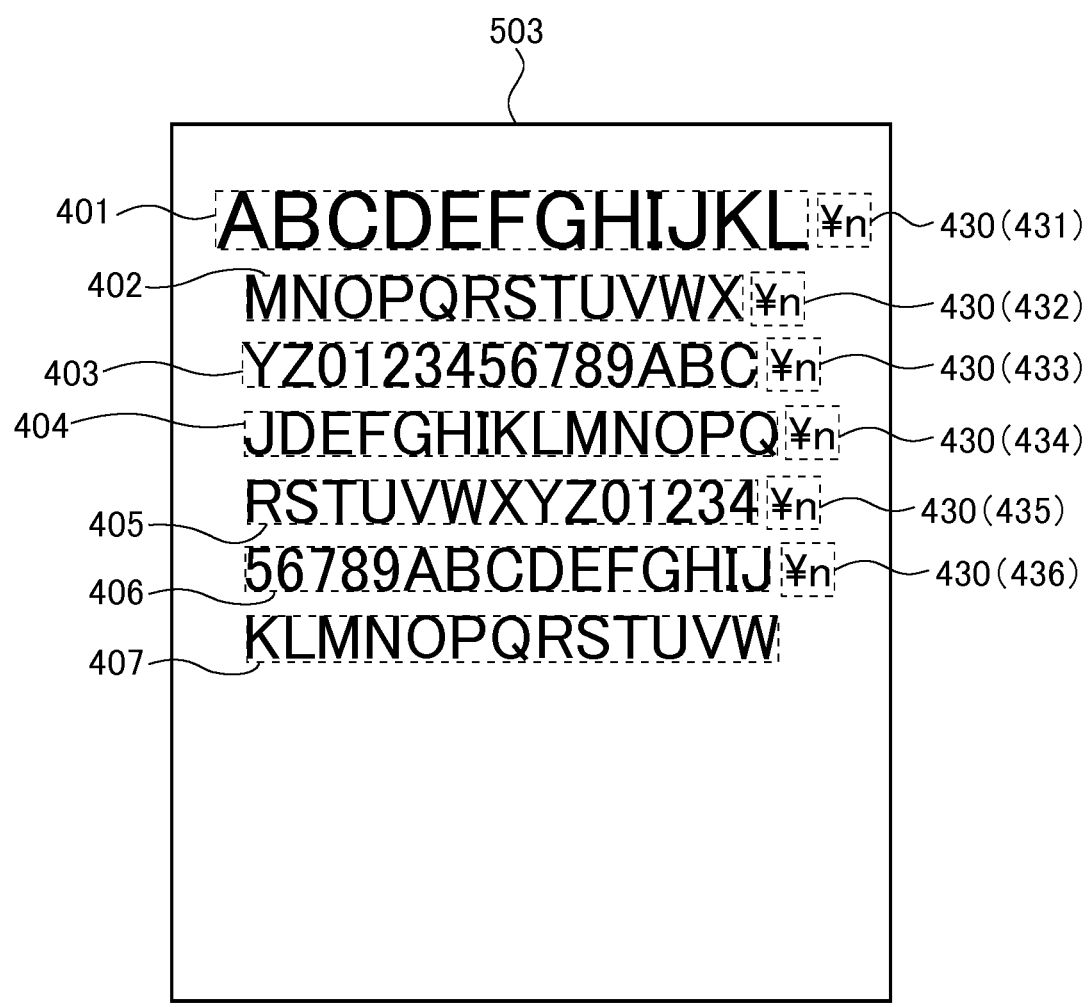
FIG. 13 is a view showing a processing object image in accordance with a third preferred embodiment.

Specifically, the external terminal 50 (the image generation part 66) performs a processing (an image processing) in which the end identification image 430 is added at the end of each of the line areas 401 to 406 other than the last line (the line area 407) among the line areas 401 to 407 in the scan image 201, on the scan image 201 as an "image generation processing" (Step S14), to thereby generate a recognition object image 500 (503) (Step S15). Herein, as shown in FIG. 13, an image ("¥n") obtained by visualizing the line feed code is added at the end of each of the line areas 401 to 406 as the end identification image 430 (431 to 436), to thereby generate the recognition object image 503. Further, though the image ("¥n") obtained by visualizing the line feed code is shown as an example of the end identification image 430 herein, the end identification image 430 is not limited to this but may be an image (including an icon or the like) indicating, for example, a figure (a triangle, a quadrangle, or the like).

Further, the detailed processing in Step S17 in the third preferred embodiment is different from that in Step S17 in the first preferred embodiment.

Specifically, the cloud server 90 extracts a plurality of line areas (also referred to as "new line areas" (for discrimination from the original line areas 401 to 407)) from the character area in the recognition object image 503. The cloud server 90, for example, extracts the new line area for the first line from the character area in the recognition object image 503. The new line area for the first line includes the original line area 401 and the end identification image 431. Similarly, the cloud server 90 extracts new line areas for the second line and afterward (including the original line areas 402 to 407 and the respective end identification images 432 to 436 (the last line area includes only the line area 407)). Then, the cloud server 90 recognizes that there are end identification images 431 to 436 at the end of the new line areas (except the last line), respectively, and determines the line areas separated by the end identification images 431 to 436 (i.e., the original line areas 401 to 407) as the unit recognition areas different from one another. After that, the cloud server 90 performs the OCR processing on the recognition object image 503, to thereby generate the text data 551 (FIG. 9) in which the delimiter codes are added at the end of the character recognition results for the line areas 401 to 407, respectively, as an OCR processing result for the recognition object image 503 (Step S17).

The process steps other than those in Steps S14 and S17 are performed like in the first preferred embodiment.

According to the present preferred embodiment, the same effect as that in the first preferred embodiment can be achieved.

4. The Fourth Preferred Embodiment

The fourth preferred embodiment is a variation of the first preferred embodiment. Hereinafter, description will be centered on the difference between the first and fourth preferred embodiments.

In the fourth preferred embodiment, the cloud server 90 determines (recognizes) each line area as a unit recognition area on the basis of a character color of the line area in the processing object image for the OCR processing. Specifically, when the character color of a (whole) line area is different from that of the next (whole) line area in the processing object image, the cloud server 90 determines one or more line areas until the line area and one or more line areas from the next line area as the unit recognition areas, respectively. Then, the cloud server 90 generates the text data 550 in which the delimiter code is added at the end of the character recognition result for each unit recognition area. On the basis of such a criterion for determination, the cloud server 90 separates the character area in the processing object image into a plurality of unit recognition areas.

Further, in the fourth preferred embodiment, the external terminal 50 performs a processing in which the character color of each line area 400 is set to a character color different from those of adjacent line areas which are adjacent to the line area 400, as an "image generation processing". By performing such an "image generation processing", the external terminal 50 (intentionally) causes the cloud server 90 to determine the plurality of line areas 400 as unit recognition areas different from one another, and acquires a desired processing result (the text data 550 in which the delimiter code is added at the end of the character recognition result for each line area 400) from the cloud server 90.

Also in the fourth preferred embodiment, the process steps shown in FIG. 4 are performed, like in the first preferred embodiment.

The detailed processing in the image generation processing (Step S14) in the fourth preferred embodiment, however, is different from that in the image generation processing (Step S14) in the first preferred embodiment.

Specifically, the external terminal 50 (the image generation part 66) performs a processing (an image processing) in which the character color of each of the line areas 401 to 407 in the scan image 201 is set to a character color different from those of the line areas (adjacent line areas) adjacent to the object line area out of the line areas 401 to 407, on the scan image 201 as an "image generation processing" (Step S14), to thereby generate a recognition object image 500 (504) (Step S15).

Figure 14:
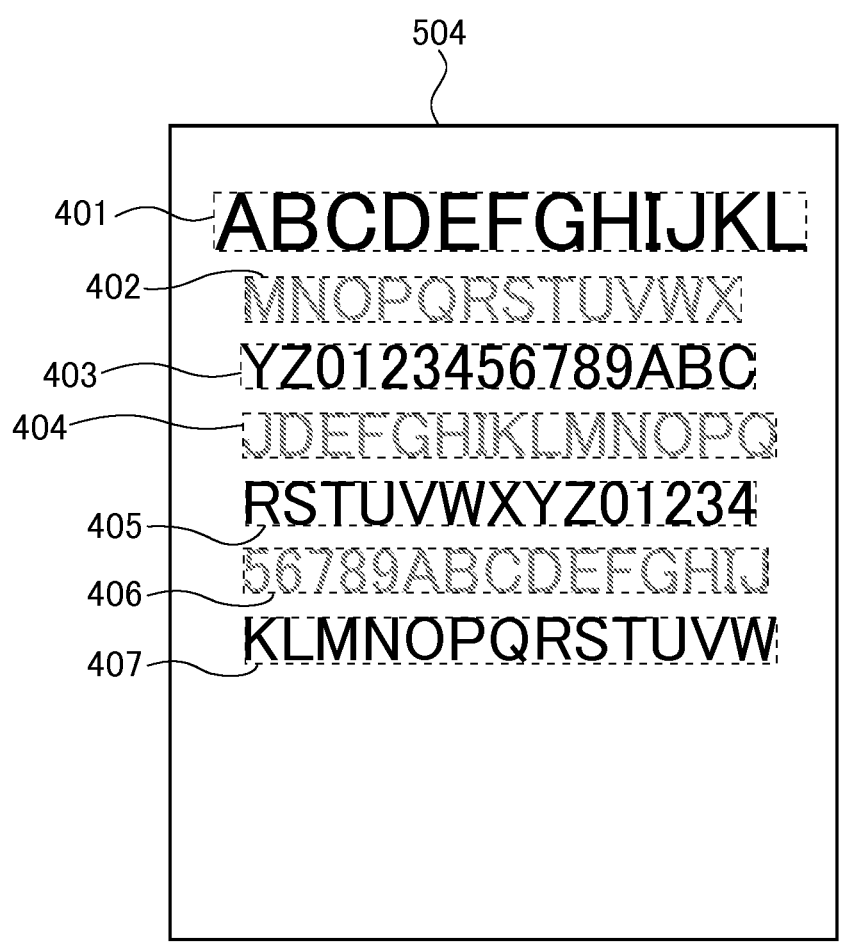
FIG. 14 is a view showing a processing object image in accordance with a fourth preferred embodiment.

As shown in FIG. 14, for example, the image generation part 66 sets the character color of the line areas 401, 403, 405, and 407 for the odd lines to "black" and sets the character color of the line areas 402, 404, and 406 for the even lines to "red". Thus, the image generation part 66 generates the recognition object image 504 by setting the character colors of the line areas 401 to 407 to (two) different character colors alternately. In other words, the image generation part 66 generates the recognition object image 504 in which the character colors of the line areas adjacent to each other are set to character colors different from each other.

Further, the detailed processing in Step S17 in the fourth preferred embodiment is different from that in Step S17 in the first preferred embodiment.

Specifically, the cloud server 90 recognizes the respective character colors of the line areas 401 to 407 in the recognition object image 504 received from the external terminal 50, and determines the line areas 401 to 407 in the recognition object image 504 as the unit recognition areas different from one another on the basis of that the character color of each of the line areas 401 to 407 is different from those of the adjacent line areas thereof. Then, the cloud server 90 performs the OCR processing on the recognition object image 504, to thereby generate the text data 551 (FIG. 9) in which the delimiter codes are added at the end of the character recognition results for the line areas 401 to 407, respectively, as an OCR processing result for the recognition object image 504 (Step S17).

The process steps other than those in Steps S14 and S17 are performed like in the first preferred embodiment.

According to the present preferred embodiment, the same effect as that in the first preferred embodiment can be achieved.

Further, though the case where the respective character colors of the line areas 401 to 407 are set to (two) different character colors alternately has been shown in the fourth preferred embodiment, this is only one exemplary case, but the respective character colors of the line areas 401 to 407 may be set to all different character colors.

There may be a case, for example, where the character color of the line area 401 is set to "red", that of the line area 402 is set to "black", that of the line area 403 is set to "blue", that of the line area 404 is set to "yellow", that of the line area 405 is set to "green", that of the line area 406 is set to "light blue", and that of the line area 407 is set to "yellow green".

5. The Fifth Preferred Embodiment

The fifth preferred embodiment is a variation of the first preferred embodiment. Hereinafter, description will be centered on the difference between the first and fifth preferred embodiments.

In the fifth preferred embodiment, the cloud server 90 determines (recognizes) each line area as a unit recognition area on the basis of a line head position (position in a character string arrangement direction (herein, horizontal direction)) of the line area in the processing object image for the OCR processing. Specifically, when the line head position of a line area is relatively largely different (in more detail, away by a predetermined number of characters (e.g., four characters) or more) from that of the next line area in the processing object image, the cloud server 90 determines one or more line areas until the line area and one or more line areas from the next line area as the unit recognition areas, respectively. Then, the cloud server 90 generates the text data 550 in which the delimiter code is added at the end of the character recognition result for each unit recognition area. On the basis of such a criterion for determination, the cloud server 90 separates the character area in the processing object image into a plurality of unit recognition areas.

Further, in the fifth preferred embodiment, the external terminal 50 performs a processing in which the line head position of each line area 400 is set to a position different from those of the adjacent line areas which are adjacent to the line area 400, as an "image generation processing". By performing such an "image generation processing", the external terminal 50 (intentionally) causes the cloud server 90 to determine the plurality of line areas 400 as unit recognition areas different from one another, and acquires a desired processing result (the text data 550 in which the delimiter code is added at the end of the character recognition result for each line area 400) from the cloud server 90.

Also in the fifth preferred embodiment, the process steps shown in FIG. 4 are performed, like in the first preferred embodiment.

The detailed processing in the image generation processing (Step S14) in the fifth preferred embodiment, however, is different from that in the image generation processing (Step S14) in the first preferred embodiment.

Specifically, the external terminal 50 (the image generation part 66) performs a processing (an image processing) in which the line head position of each of the line areas 401 to 407 in the scan image 201 is set to a position different from those of the line areas (adjacent line areas) adjacent to the object line area out of the line areas 401 to 407, on the scan image 201 as an "image generation processing" (Step S14), to thereby generate a recognition object image 500 (505) (Step S15).

Figure 15:
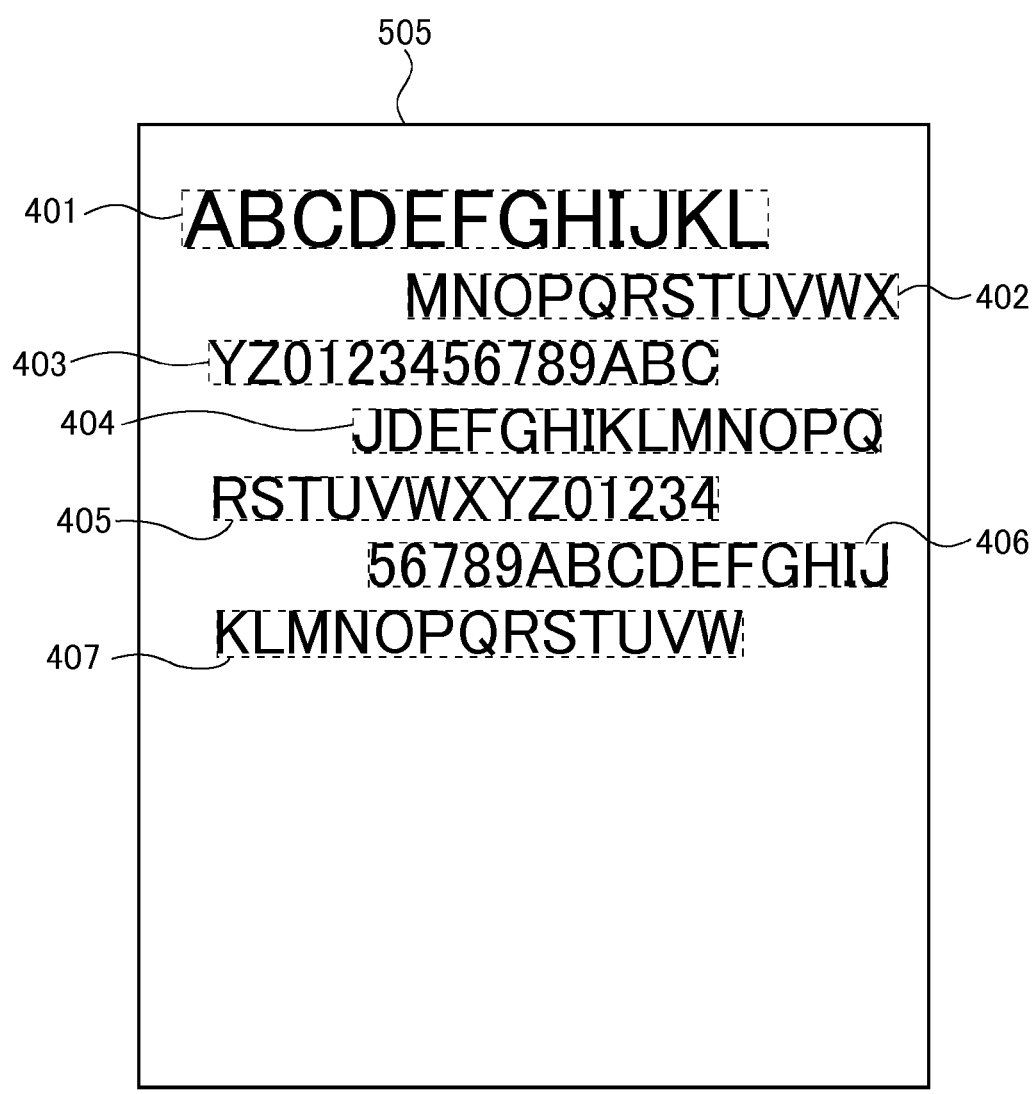
FIG. 15 is a view showing a processing object image in accordance with a fifth preferred embodiment.

As shown in FIG. 15, for example, the image generation part 66 sets the respective line head positions (the coordinate positions of the left end) of the line areas 401, 403, 405, and 407 for the odd lines to positions on the relatively left side in the recognition object image 505. Further, the image generation part 66 sets the respective line head positions of the line areas 402, 404, and 406 for the even lines to positions which are relatively away from the line head positions of the line areas 401, 403, 405, and 407 (herein, on the right side from the line head positions of the line areas 401, 403, 405, and 407 by four or more characters). Thus, the image generation part 66 generates the recognition object image 505 in which the line head positions of the line areas adjacent to each other are set to positions different from each other.

Further, the detailed processing in Step S17 in the fifth preferred embodiment is different from that in Step S17 in the first preferred embodiment.

Specifically, the cloud server 90 determines the line areas 401 to 407 in the recognition object image 505 as the unit recognition areas different from one another on the basis of that the line head position of each of the line areas 401 to 407 in the recognition object image 505 received from the external terminal 50 is different from those of the adjacent line areas thereof. Then, the cloud server 90 performs the OCR processing on the recognition object image 505, to thereby generate the text data 551 (FIG. 9) in which the delimiter codes are added at the end of the character recognition results for the line areas 401 to 407, respectively, as an OCR processing result for the recognition object image 505 (Step S17).

The process steps other than those in Steps S14 and S17 are performed like in the first preferred embodiment.

According to the present preferred embodiment, the same effect as that in the first preferred embodiment can be achieved.

6. The Sixth Preferred Embodiment

The sixth preferred embodiment is a variation of the first preferred embodiment. Hereinafter, description will be centered on the difference between the first and sixth preferred embodiments.

In the sixth preferred embodiment, the cloud server 90 determines (recognizes) each line area as a unit recognition area on the basis of a character size of the line area in the processing object image for the OCR processing. Specifically, when the character size of a (whole) line area is different (in more detail, by a predetermined point or more) from that of the next (whole) line area in the processing object image, the cloud server 90 determines one or more line areas until the line area and one or more line areas from the next line area as the unit recognition areas, respectively. Then, the cloud server 90 generates the text data 550 in which the delimiter code is added at the end of the character recognition result for each unit recognition area. On the basis of such a criterion for determination, the cloud server 90 separates the character area in the processing object image into a plurality of unit recognition areas.

Further, in the sixth preferred embodiment, the external terminal 50 performs a processing in which the character size of each line area 400 is set to a character size different from those of the adjacent line areas which are adjacent to the line area 400, as an "image generation processing". By performing such an "image generation processing", the external terminal 50 (intentionally) causes the cloud server 90 to determine the plurality of line areas 400 as unit recognition areas different from one another, and acquires a desired processing result (the text data 550 in which the delimiter code is added at the end of the character recognition result for each line area 400) from the cloud server 90.

Also in the sixth preferred embodiment, the process steps shown in FIG. 4 are performed, like in the first preferred embodiment.

The detailed processing in the image generation processing (Step S14) in the sixth preferred embodiment, however, is different from that in the image generation processing (Step S14) in the first preferred embodiment.

Specifically, the external terminal 50 (the image generation part 66) performs a processing (an image processing) in which the character size of each of the line areas 401 to 407 in the scan image 201 is set to a character size different from those of the line areas (adjacent line areas) adjacent to the object line area out of the line areas 401 to 407, on the scan image 201 as an "image generation processing" (Step S14), to thereby generate a recognition object image 500 (506) (Step S15).

Figure 16:
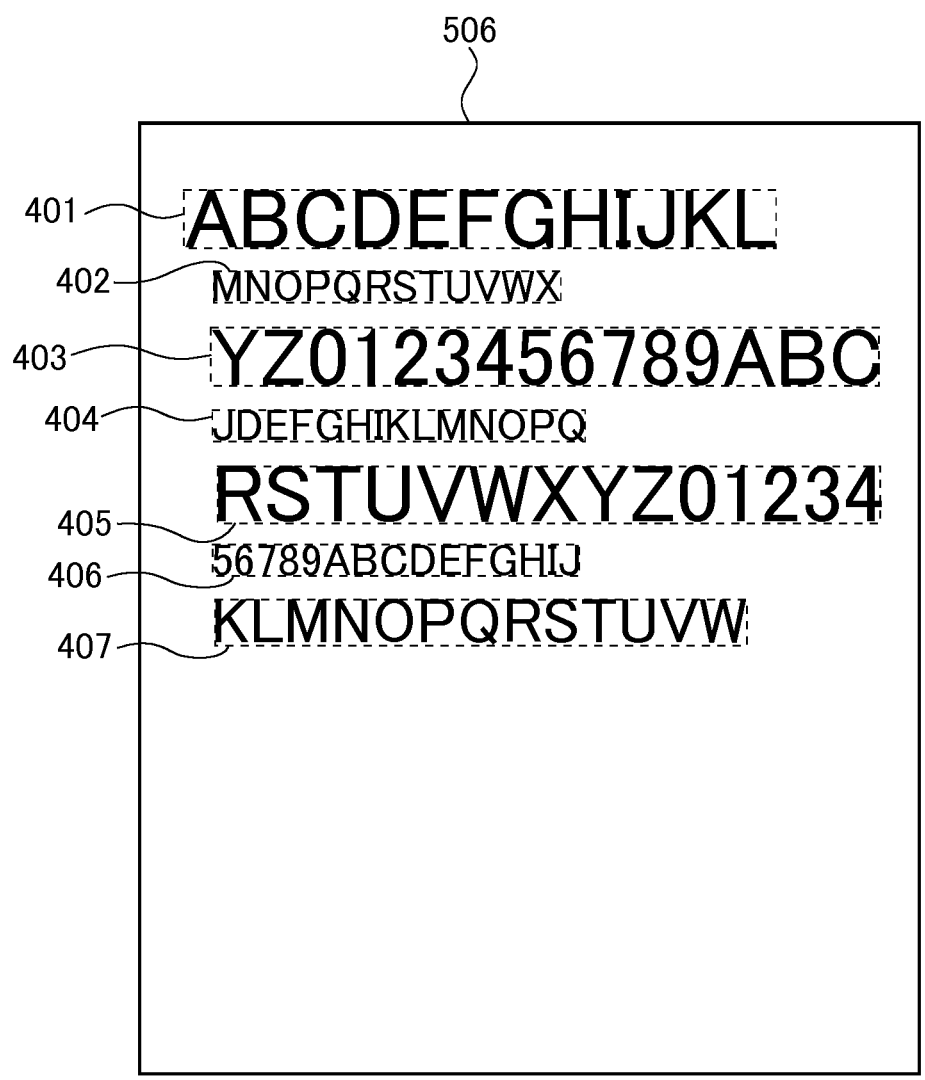
FIG. 16 is a view showing a processing object image in accordance with a sixth preferred embodiment.

As shown in FIG. 16, for example, the image generation part 66 sets the character sizes of the line areas 401, 403, 405, and 407 for the odd lines to relatively large character sizes (e.g., 32 points). The image generation part 66 sets the character size of the line areas 402, 404, and 406 for the even lines to relatively small character sizes (e.g., 16 points) as compared with those of the line areas 401, 403, 405, and 407. Thus, the image generation part 66 generates the recognition object image 506 in which the character sizes of the line areas adjacent to each other are set to character sizes different from each other.

Further, the detailed processing in Step S17 in the sixth preferred embodiment is different from that in Step S17 in the first preferred embodiment.

Specifically, the cloud server 90 recognizes the respective character sizes of the line areas 401 to 407 in the recognition object image 506 received from the external terminal 50, and determines the line areas 401 to 407 in the recognition object image 506 as the unit recognition areas different from one another on the basis of that the character size of each of the line areas 401 to 407 is different from those of the adjacent line areas thereof. Then, the cloud server 90 performs the OCR processing on the recognition object image 506, to thereby generate the text data 551 (FIG. 9) in which the delimiter codes are added at the end of the character recognition results for the line areas 401 to 407, respectively, as an OCR processing result for the recognition object image 506 (Step S17).

The process steps other than those in Steps S14 and S17 are performed like in the first preferred embodiment.

According to the present preferred embodiment, the same effect as that in the first preferred embodiment can be achieved.

7. The Seventh Preferred Embodiment

In the above-described preferred embodiments, the case has been shown where assuming that the determination method (for example, the method of determining the unit recognition area on the basis of the separation interval between the line areas) to be used to determine the unit recognition area by the cloud server 90 is known by the program designer or the like of the external terminal 50, the image generation processing in accordance with the determination method is performed on the scan image 200.

In the seventh preferred embodiment, a case will be shown where when the determination method is not known by the program designer or the like of the external terminal 50 (in other words, when the external terminal 50 does not know the determination method), the external terminal 50 inquires the determination method of the cloud server 90 and performs the image generation processing in accordance with the determination method given by the cloud server 90, on the scan image 200.

Figure 17:
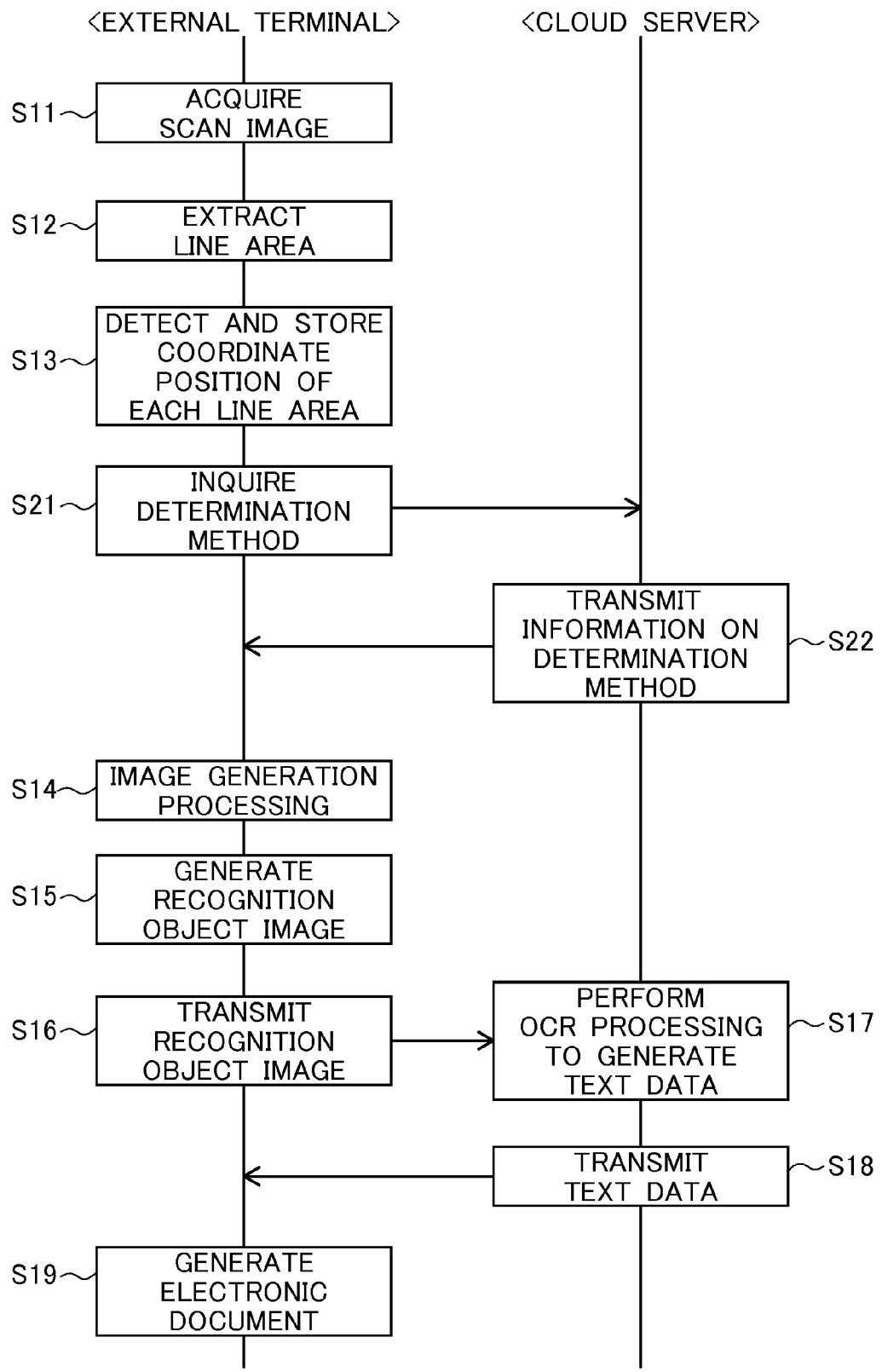
FIG. 17 is a timing chart showing an exemplary operation of the electronic document generation system in accordance with a seventh preferred embodiment.

FIG. 17 is a timing chart showing an exemplary operation of the electronic document generation system 1 in accordance with the seventh preferred embodiment. As shown in FIG. 17, in addition to the same process steps as those of Steps S11 to S19 shown in FIG. 4, process steps of Steps S21 and S22 are executed between Steps S13 and S14.

Specifically, after the execution of Steps S11 to S13 and prior to generation of the recognition object image 500, the external terminal 50 inquires of the cloud server 90, the determination method to be used to determine the unit recognition area by the cloud server 90 (Step S21).

In response to the inquiry from the external terminal 50, the cloud server 90 transmits information on the determination method to the external terminal 50 (Step S22). In the case, for example, where the determination method (criterion for determination for the unit recognition area) to be used to determine the unit recognition area by the cloud server 90 is the method of determining the unit recognition area on the basis of the delimiter line (see the second preferred embodiment), the cloud server 90 transmits this information to the external terminal 50.

When the external terminal 50 receives the information on the determination method from the cloud server 90, the external terminal 50 performs the image generation processing in accordance with the determination method on the scan image 200 (Step S14), to thereby generate the recognition object image 500 (Step S15).

When the external terminal 50 (the document generation part 67) receives the information indicating that the cloud server 90 determines the unit recognition area on the basis of the delimiter line, for example, the external terminal 50 (the document generation part 67) performs the processing in which the delimiter line L is added to each of the mutual line space areas between the plurality of line areas 400 in the scan image 200, as the image generation processing (Step S14), to thereby generate the recognition object image 500 (Step S15) (also see FIG. 12).

The process steps in Step S16 and afterward are performed like in the above-described preferred embodiments.

According to the present preferred embodiment, even when the external terminal 50 does not know the determination method to be used to determine the unit recognition area by the cloud server 90, since the external terminal 50 can acquire the information on the determination method by inquiring of the cloud server 90, it is possible to perform a proper image generation processing in accordance with the determination method on the scan image 200.

Further, even when there are a plurality of cloud servers 90 and the cloud servers 90 adopt different determination methods, the external terminal 50 can acquire the information on the determination method by inquiring of the cloud server 90, the determination method which the cloud server 90 adopts. Therefore, it is possible to perform a proper image generation processing in accordance with the determination method adopted by each cloud server 90, on the scan image 200.

8. The Eighth Preferred Embodiment

In the seventh preferred embodiment, the case has been shown where when the external terminal 50 does not know the determination method to be used to determine the unit recognition area by the cloud server 90, the external terminal 50 acquires the information on the determination method by inquiring the determination method of the cloud server 90 and performs the image generation processing in accordance with the determination method.

In the eighth preferred embodiment, when the external terminal 50 does not know the determination method, a plurality of test images on which a plurality of different image generation processings have been performed, respectively, are generated, and the cloud server 90 performs the OCR processing on the test images. Then, the determination method is specified (inferred) on the basis of the respective OCR processing results, and the image generation processing (optimal processing) in accordance with the specified determination method is performed.

Figure 18:
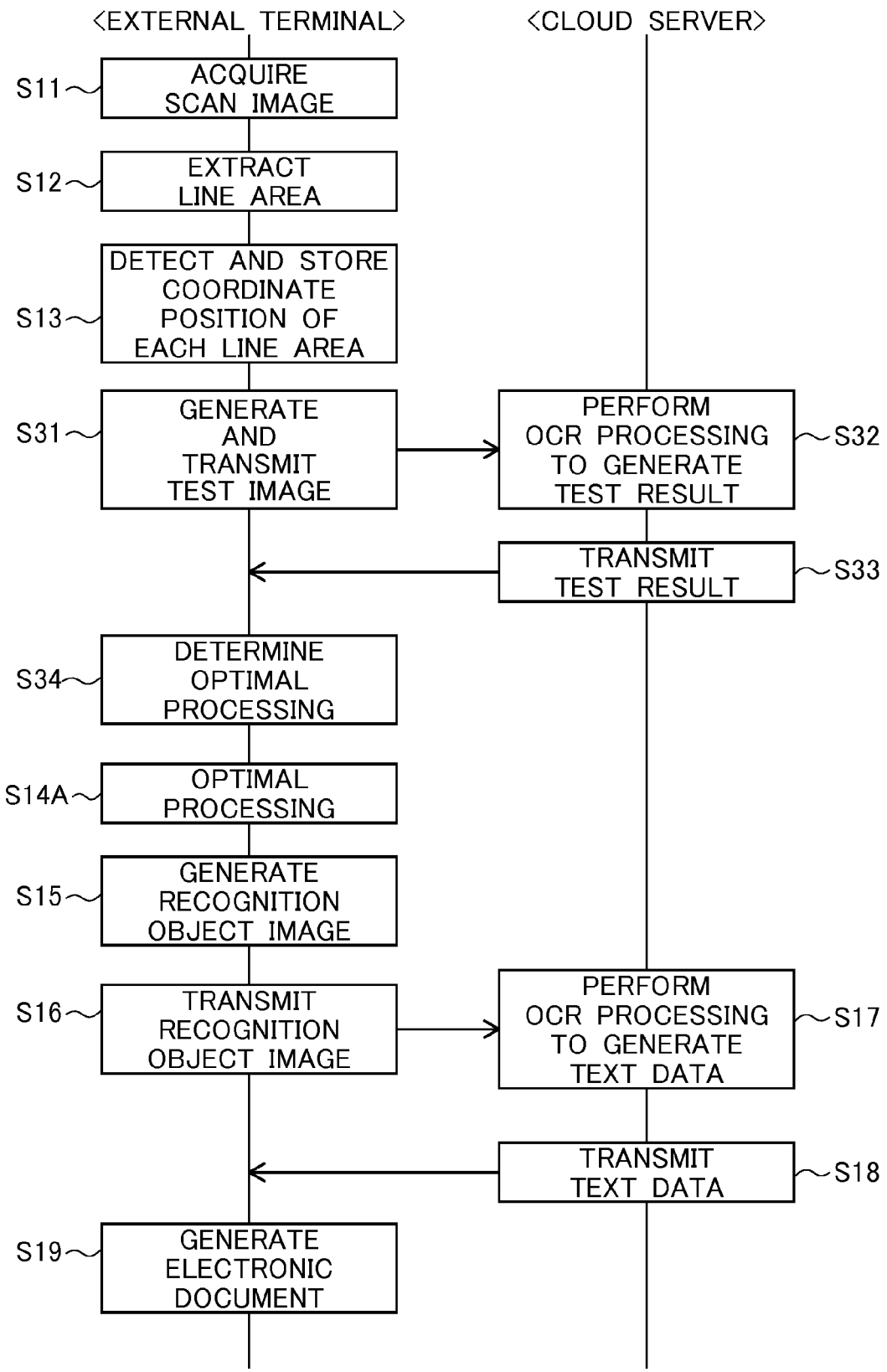
FIG. 18 is a timing chart showing an exemplary operation of the electronic document generation system in accordance with an eighth preferred embodiment.

FIG. 18 is a timing chart showing an exemplary operation of the electronic document generation system 1 in accordance with the eighth preferred embodiment. As shown in FIG. 18, in addition to the same process steps as those of Steps S11 to S19 shown in FIG. 4, process steps of Steps S31 and S34 are executed between Steps S13 and S14 (S14A).

Figure 19:
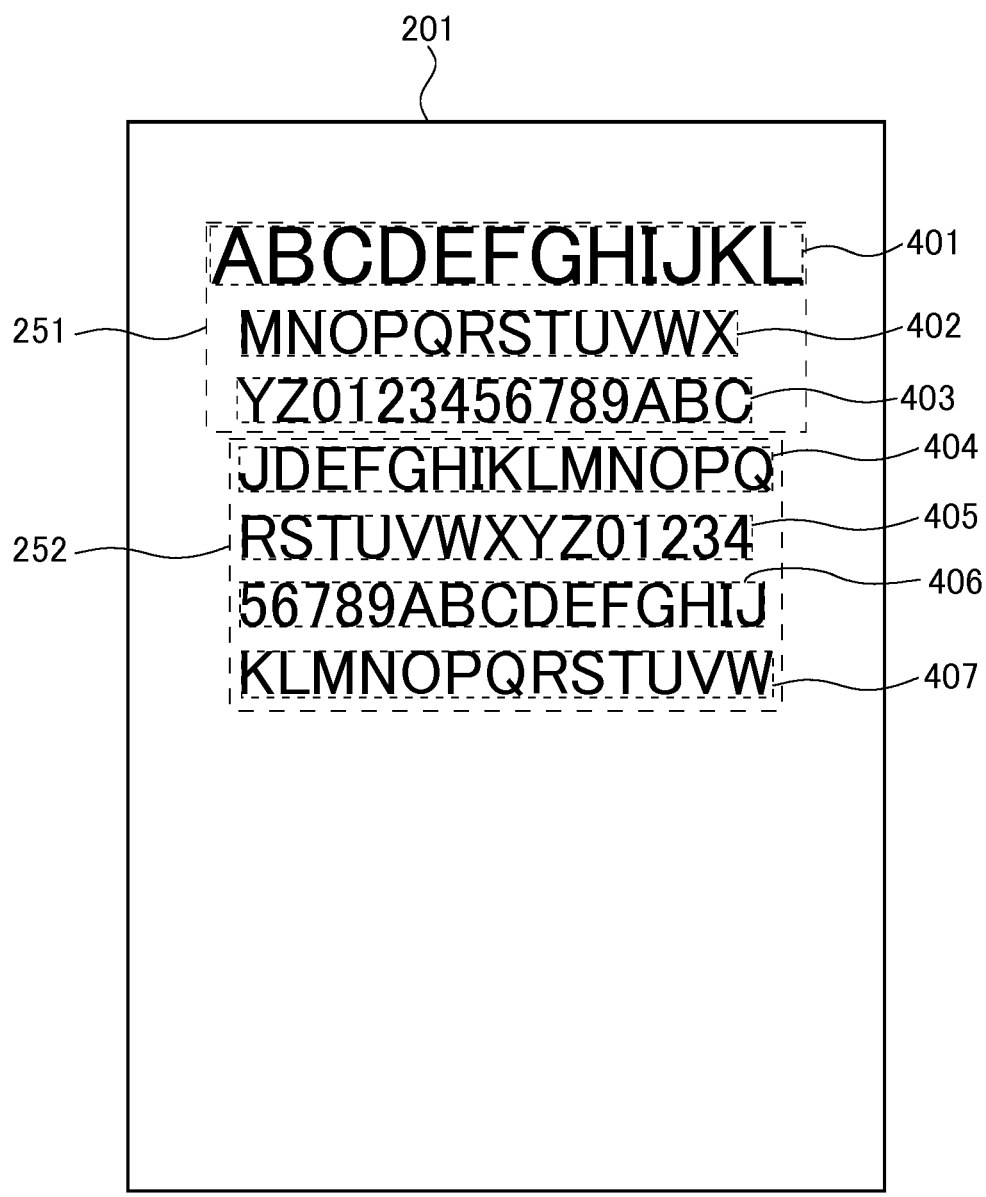
FIG. 19 is a view used for explaining extraction of some line areas.

Specifically, after the execution of Steps S11 to S13, the extraction part 64 extracts some (two or more) of the line areas 401 to 407 (herein, a portion 251 including three line areas 401 to 403) from the scan image 201 (see FIG. 19). In more detail, the extraction part 64 extracts three line areas 401 to 403 out of the line areas 401 to 407, and the image generation part 66 generates a partial image (an image based on the portion 251). Further, when the portion 251 is extracted, the image generation part 66 detects the number (line area count) of line areas (some line areas 401 to 403) in the portion 251.

Figure 20:
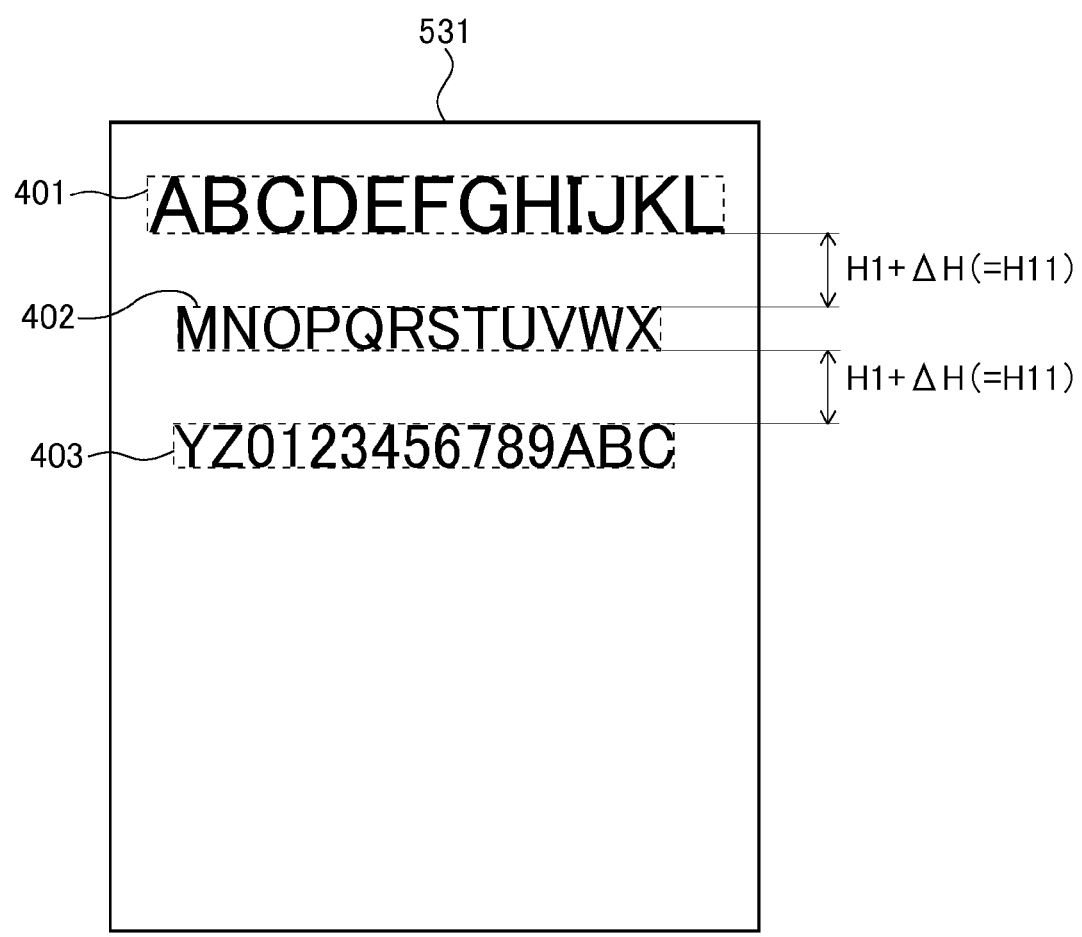
FIGS. 20 to 22 are views each showing a test image.
Figure 21:
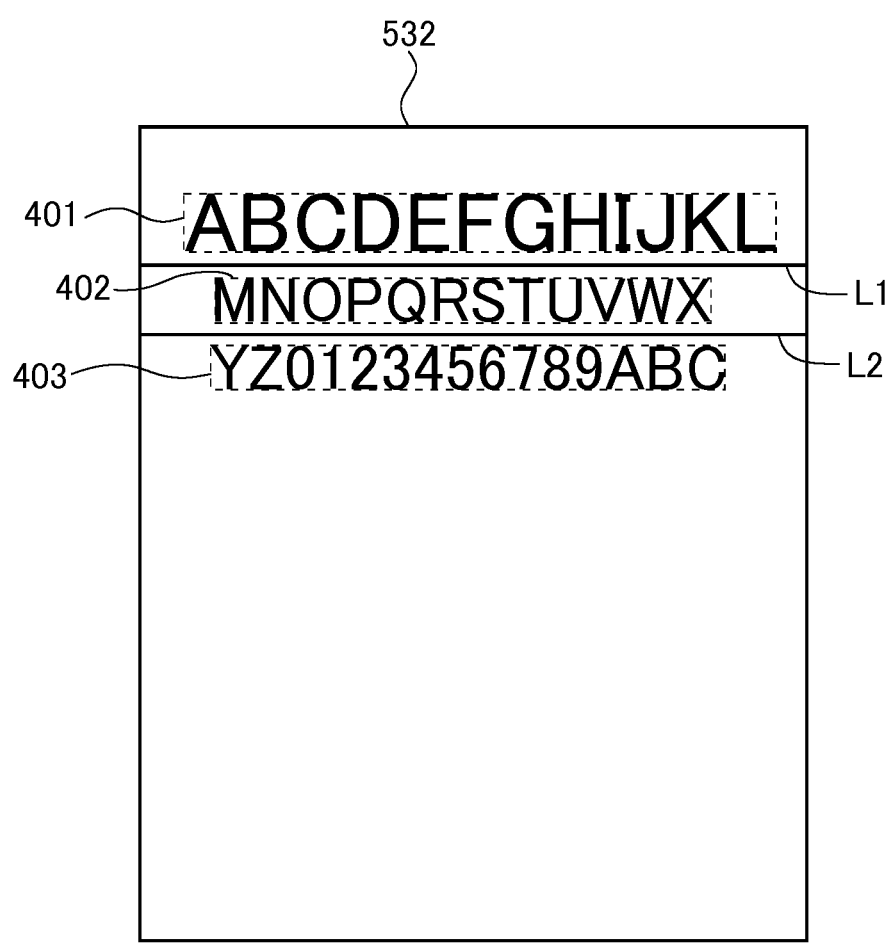
Figure 22:
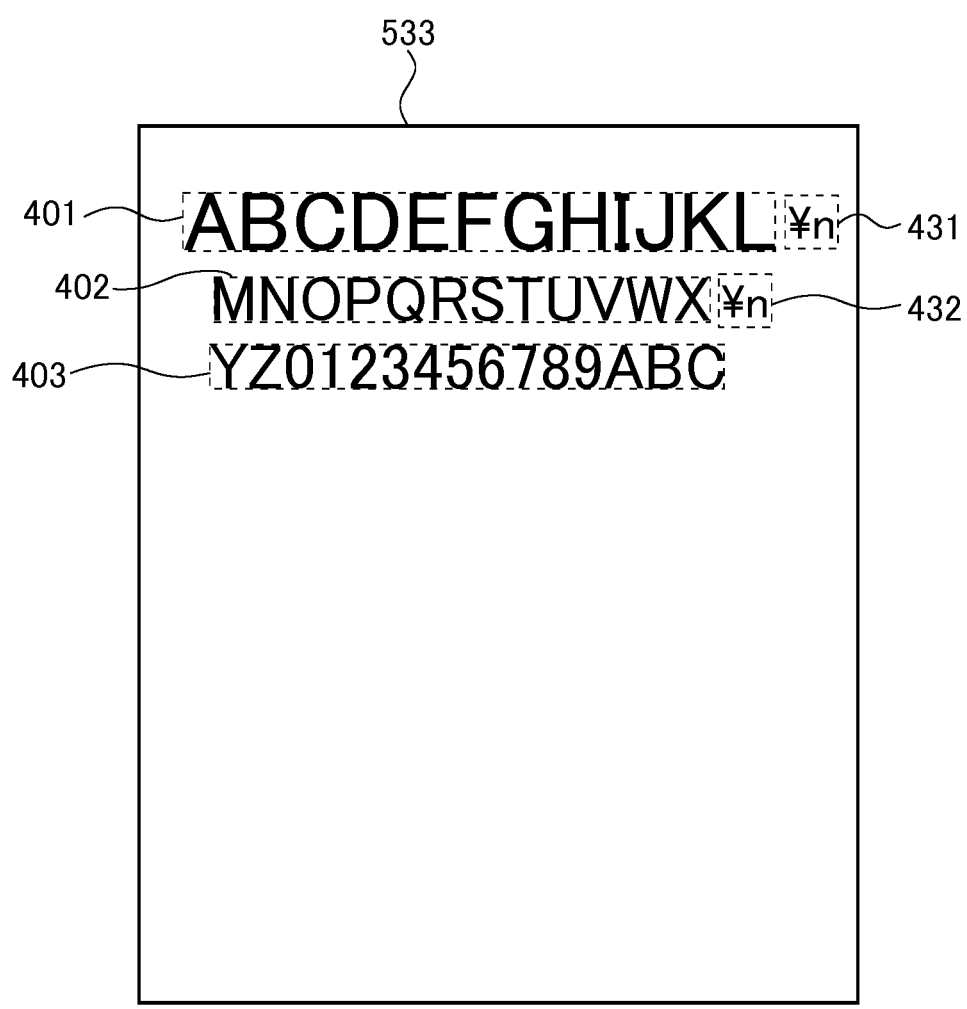

Then, the image generation part 66 performs a plurality of (herein, three) different image generation processings (701 to 703 or the like) on the portion (partial image) 251, to thereby generate a plurality of different test images (531 to 533 or the like) (Step S31). Specifically, the image generation part 66 performs the image generation processing 701 (in which the mutual separation intervals between the line areas are set to each have the size H10 not smaller than the highest height H (the size H11 (=H1+ΔH) not smaller than the height H1 of the line area 401)) on the portion 251 (the line areas 401 to 403), to thereby generate the test image 531 (FIG. 20). Further, the image generation part 66 performs the image generation processing 702 (in which the delimiter lines L (L1, L2) are added to the line space areas between the line areas, respectively) on the portion 251, to thereby generate the test image 532 (FIG. 21). Furthermore, the image generation part 66 performs the image generation processing 703 (in which the end identification images 430 (431, 432) are added at the end of the line areas, respectively) on the portion 251, to thereby generate the test image 533 (FIG. 22). Then, the transmitting part 54a transmits the plurality of test images 531 to 533 to the cloud server 90 (Step S31).

When the cloud server 90 receives the plurality of test images 531 to 533 from the external terminal 50, the cloud server 90 performs the OCR processing on the test images 531 to 533, to thereby generate a plurality of test results (OCR processing results (text data) 570 (571 to 573) (FIG. 23) (Step S32). Then, the cloud server 90 transmits the plurality of test results 571 to 573 to the external terminal 50 (Step S33).

When the external terminal 50 receives the plurality of test results 571 to 573 from the cloud server 90, the external terminal 50 determines an optimal processing (Step S34).

Figure 23:
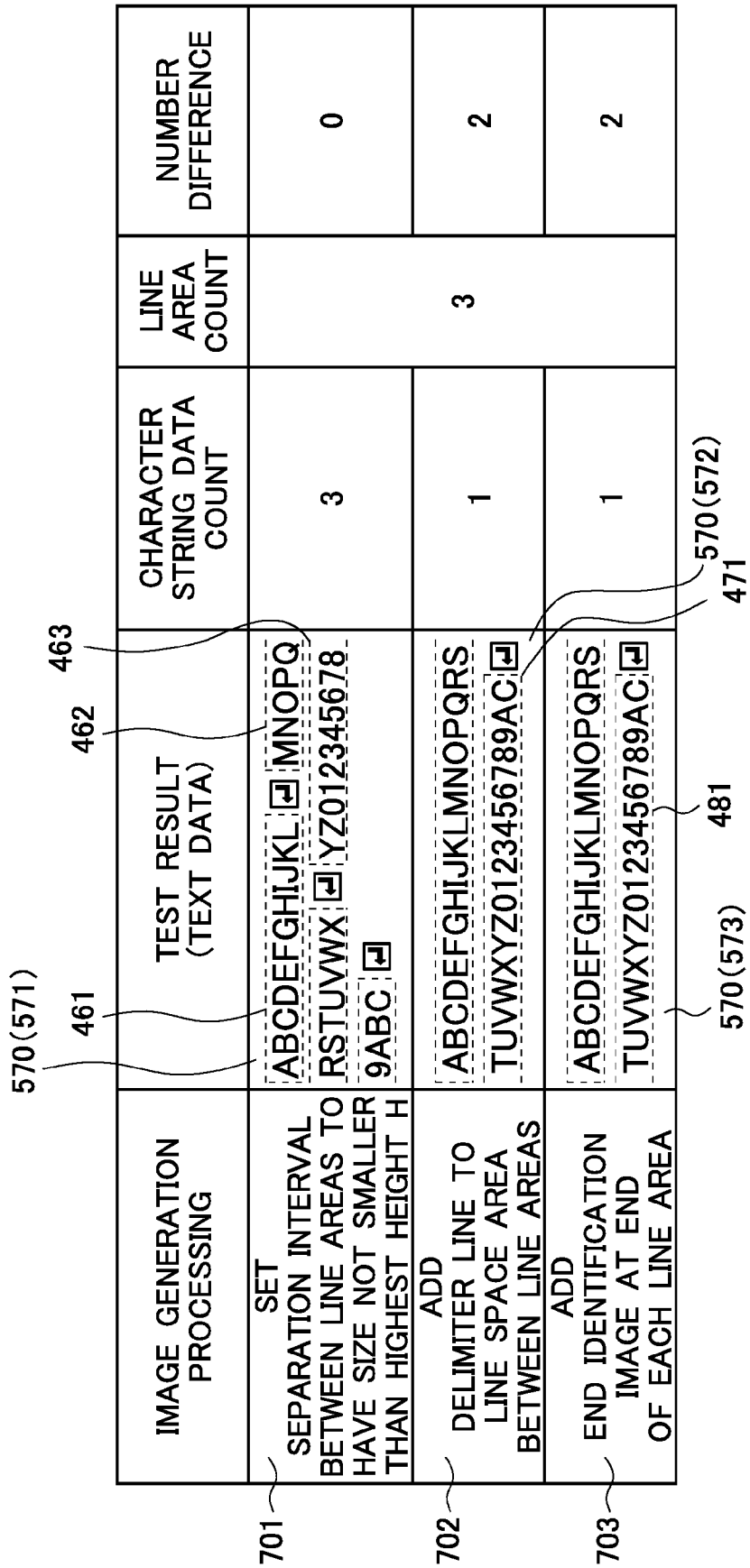
FIG. 23 is a view used for explaining determination of an optimal processing.

Specifically, the external terminal 50 (the image generation part 66) detects the number (character string data count) of pieces of character string data (character recognition results) included in each of the test results 571 to 573 on the basis of the delimiter codes (line feed codes) included in each of the test results 571 to 573. As shown in FIG. 23, the number of delimiter codes included in the test result (OCR processing result) 571 for the test image 531 on which the image generation processing 701 has been performed is "3" and the character string data count (the number of character string data 461 to 463) is "3". Further, the number of delimiter codes included in the test result 572 for the test image 532 on which the image generation processing 702 has been performed is "1" and the character string data count (the number of character string data 471) is "1". Furthermore, the number of delimiter codes included in the test result 573 for the test image 533 on which the image generation processing 703 has been performed is "1" and the character string data count (the number of character string data 481) is "1".

Then, the image generation part 66 obtains the difference (number difference) between the character string data count and the number (line area count) of some line areas (the portion 251 (line areas 401 to 403)) with respect to each of the plurality of test results 571 to 573. After the number difference is obtained with respect to each of the plurality of test results 571 to 573, the image generation part 66 obtains the test result with the smallest number difference as a best test result, out of the plurality of test results 571 to 573. Herein, the line area count of some line areas (line areas 401 to 403 included in the portion 251) included in each of the test images 531 to 533 is "3", and among the test results 571 to 573, a test result which has the smallest difference (number difference) between the character string data count (in other words, the number of delimiter codes) and the line area count of "3" is the test result 571. The test result 571 is determined as the best test result.

After the best test result is obtained, the image generation part 66 determines the image generation processing (herein, the image generation processing 701) corresponding to the best test result 571 among the plurality of image generation processings 701 to 703, as the "optimal processing" (see FIG. 23).

Thus, when the external terminal 50 does not know the determination method to be used to determine the unit recognition area by the cloud server 90, generated are the plurality of different test images 531 to 533 on which the plurality of different image generation processings 701 to 703 have been performed, respectively. Then, on the basis of the plurality of OCR processing results (test results) 571 to 573 for the test images 531 to 533, the optimal processing is determined. In other words, the external terminal 50 specifies (infers) the determination method to be used to determine the unit recognition area by the cloud server 90 by causing the cloud server 90 to perform the OCR processing on the plurality of different test images 531 to 533 on which the plurality of different image generation processings have been performed, respectively.

Figure 24:
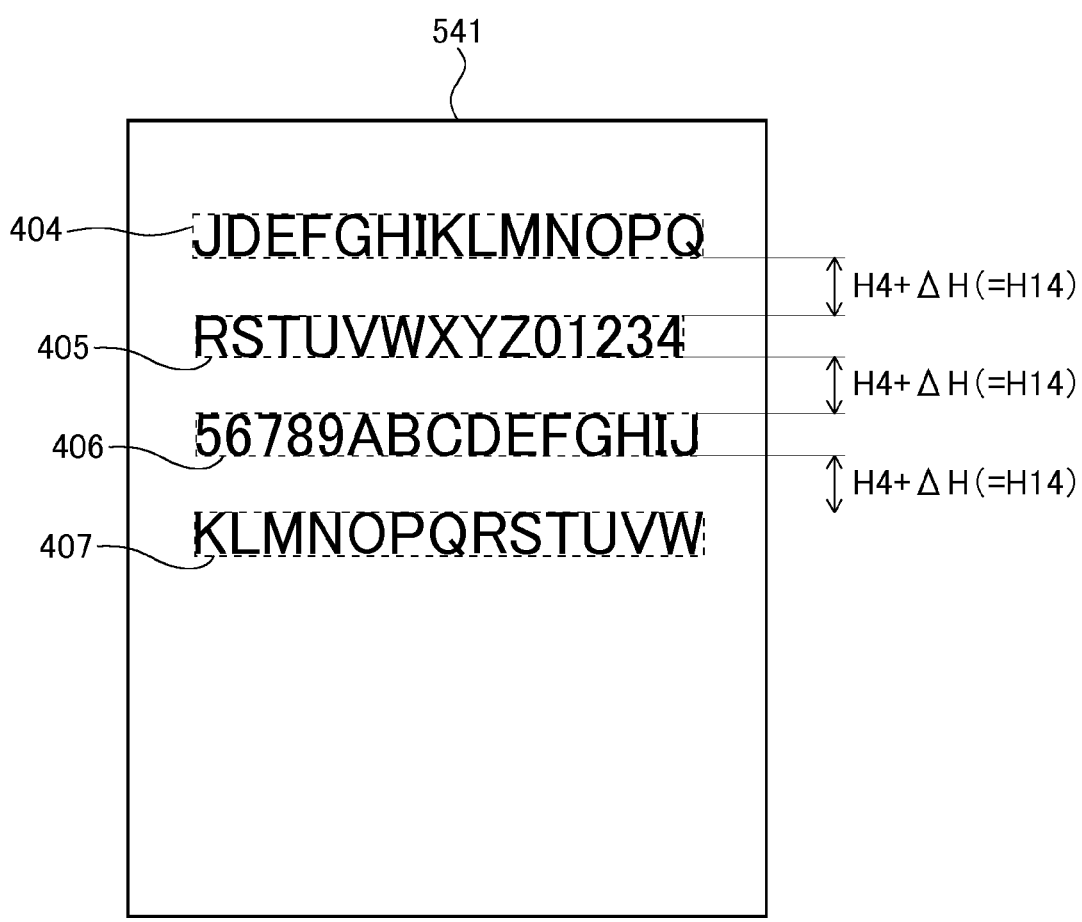
FIG. 24 is a view showing a recognition object image on the remaining line areas.

After the optimal processing is determined (Step S44), the extraction part 64 extracts remaining line areas 404 to 407 (portion 252) (FIG. 19) which are the rest of the line areas 401 to 407 in the scan image 201 other than the line areas 401 to 403, from the scan image 201. In more detail, the extraction part 64 extracts the remaining line areas 404 to 407 out of the line areas 401 to 407, and the image generation part 66 generates a partial image (an image based on the portion 252). Then, the image generation part 66 performs the optimal processing (the image generation processing 701) on the portion (partial image) 252 (Step S14A), to thereby generate a recognition object image 541 (FIG. 24) (Step S15). In the recognition object image 541, by performing the optimal processing, the mutual separation intervals between the line areas 404 to 407 are set to each have a size H14 (=H4+ΔH) not smaller than the height of the tallest one (herein, the height H4 of the line area 404) of the line areas 404 to 407, and the line areas 404 to 407 are arranged.

Then, the recognition object image 541 is transmitted from the external terminal 50 to the cloud server 90 (Step S16), and the cloud server 90 performs the OCR processing on the recognition object image 541, to thereby generate text data 581 (text data on the remaining line areas 404 to 407) (FIG. 25) (Step S17).

Figure 25:
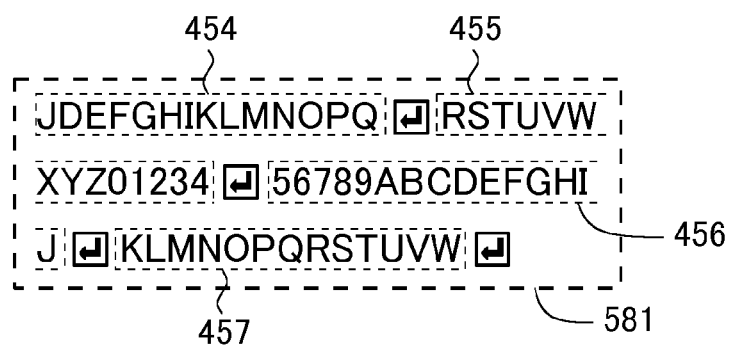
FIG. 25 is a view showing text data on the remaining line areas.

When the text data 581 is received from the cloud server 90 (Step S18), the external terminal 50 (the document generation part 67) separates data consisting of the best test result 571 and the text data 581 into a plurality of pieces of character string data on the basis of the delimiter codes included in the best test result 571 (FIG. 23) and the delimiter codes included in the text data 581 (FIG. 25).

Specifically, the document generation part 67 separates the best test result 571 (the OCR processing results for the line areas 401 to 403) into three pieces of character string data 461 to 463 (FIG. 23) on the basis of the three delimiter codes. Further, the document generation part 67 separates the text data 581 (the OCR processing results for the line areas 404 to 407) into four pieces of character string data 454 to 457 (FIG. 25) on the basis of the four delimiter codes.

Then, the document generation part 67 determines the correspondence between the line areas 401 to 407 and the character string data 461 to 463 and 454 to 457, and arranges the character string data 461 to 463 and 454 to 457 in the corresponding line areas 401 to 407, respectively, to thereby generate the electronic document 600 (601).

According to the present preferred embodiment, even when the external terminal 50 does not know the determination method to be used to determine the unit recognition area by the cloud server 90, since the external terminal 50 can specify the determination method by using the plurality of different test images on which the plurality of different image generation processings are performed, respectively, it is possible to perform the (proper) image generation processing in accordance with the specified determination method on the scan image 200.

Further, though the case where the portion 251 (the line areas 401 to 403) is extracted from the scan image 201 and the plurality of different image generation processings are performed on the portion 251, respectively, has been shown in the eighth preferred embodiment, this is only one exemplary case.

For example, the plurality of different image generation processings may be performed on a sample image (an image consisting of two or more line areas), respectively, instead of the scan image 200 (201).

Specifically, the external terminal 50 (the image generation part 66) extracts the sample image from the storage part 55 and performs the plurality of different image generation processings on the sample image, respectively, to thereby generate a plurality of different test images 530 (Step S31). Further, when the sample image is extracted, the image generation part 66 detects the number (line area count) of line areas in the sample image. Then, the external terminal 50 transmits the plurality of test images 530 to the cloud server 90 (Step S31).

The cloud server 90 performs the OCR processing on the test images 530 received from the external terminal 50, to thereby generate the plurality of test results (OCR processing results) 570 (FIG. 23) (Step S32). Then, the cloud server 90 transmits the plurality of test results 570 to the external terminal 50 (Step S33).

When the external terminal 50 receives the plurality of test results 570 from the cloud server 90, the external terminal 50 determines the optimal processing in the following manner (Step S34).

Specifically, the external terminal 50 (the image generation part 66) detects the number (character string data count) of pieces of character string data included in each of the plurality of test results on the basis of the delimiter codes included in each of the plurality of test results 570. Then, the image generation part 66 obtains the difference (number difference) between the character string data count and the number (line area count) of line areas included in the sample image with respect to each of the plurality of test results 570. After the number difference is obtained with respect to each of the plurality of test results 570, the image generation part 66 obtains one of the plurality of test results 570 which has the smallest number difference, as the best test result, and determines the image generation processing corresponding to the best test result, out of the plurality of image generation processings, as the "optimal processing".

After the optimal processing is determined, the image generation part 66 performs the optimal processing on the scan image 201 (Step S14A), to thereby generate the recognition object image 500 (Step S15).

The process steps in Step S16 and afterward are performed like in the above-described first to seventh preferred embodiments.

Further, though the case has been shown where the plurality of different test images 530 are generated by the image generation part 66 on the basis of the sample image herein, the plurality of test images 530 may be generated and stored in advance by the external terminal 50. Furthermore, the line area count in each of the plurality of test images 530 may be detected in advance.

9. Variations

Though the preferred embodiments of the present invention have been described above, the present invention is not limited to the above-described preferred embodiments.

For example, though the case has been shown where the image generation processing is performed on the whole scan image 201 to thereby generate one recognition object image 500 in the above-described preferred embodiments, the present invention is not limited to this case. Specifically, the line areas 401 to 407 in the scan image 201 are separated into a plurality of portions (e.g., two portions (the line areas 401 to 403 and the line areas 404 to 407)), and the image generation processing and the following process steps (Steps S14 to S19) may be performed on each of the plurality of portions.

Further, though the case has been shown where the single image generation processing is performed on the scan image 200 (201) to thereby generate the recognition object image 500 in the above-described preferred embodiments, the present invention is not limited to this case, but a plurality of image generation processings may be performed to generate the recognition object image 500.

Figure 26:
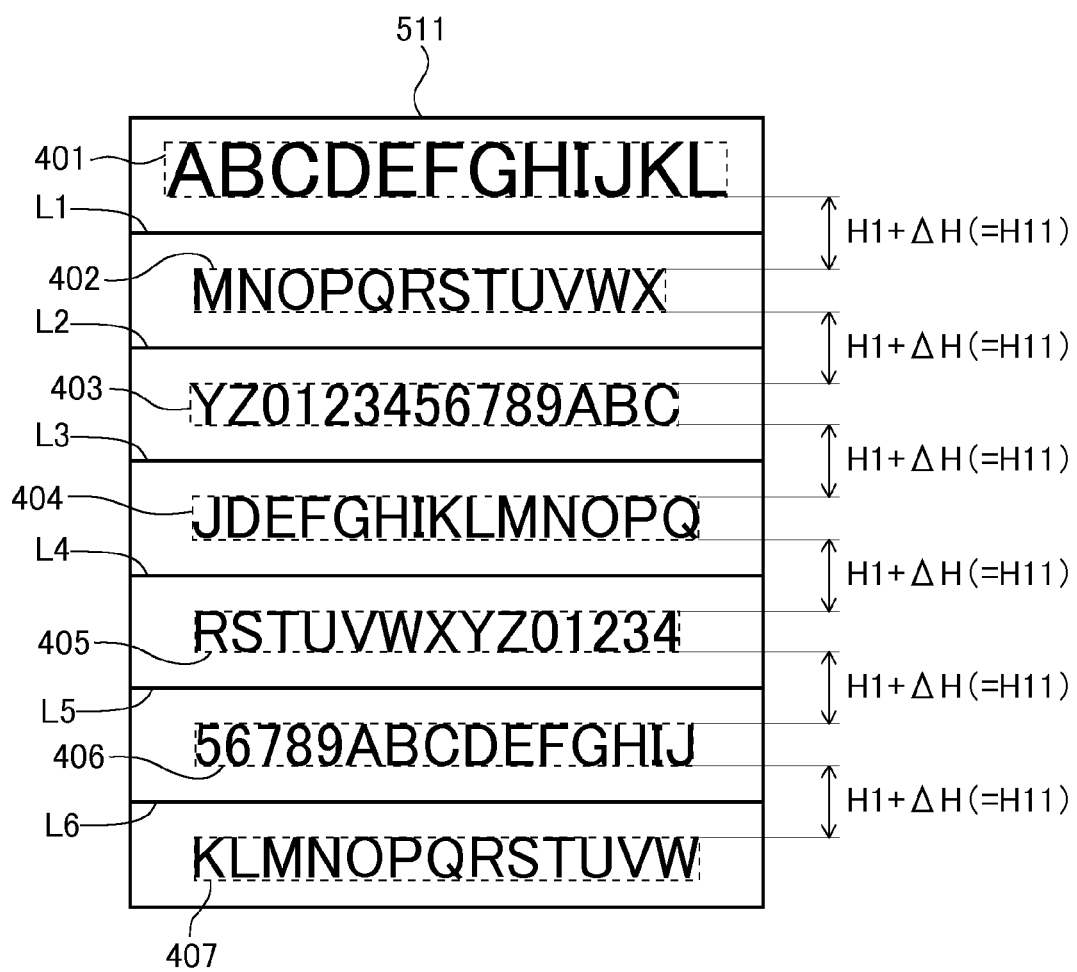
FIG. 26 is a view showing a recognition object image in accordance with a variation.

For example, the external terminal 50 (the image generation part 66) performs a plurality of (herein, two) image generation processings on the scan image 201, to thereby generate the recognition object image 500 (511). Specifically, the image generation part 66 performs the processing in which the mutual separation intervals between the plurality of line areas 401 to 407 in the scan image 201 are set to each have the size H11 (=H1+ΔH) not smaller than the height of the tallest one of the plurality of line areas 401 to 407 (the height H1 of the line area 401), as the first image generation processing (see the first preferred embodiment). Then, the image generation part 66 performs the processing in which the delimiter lines L (L1 to L6) are added to the line space areas between the plurality of line areas 401 to 407, respectively, as the second image generation processing (see the second preferred embodiment). The image generation part 66 performs these two image generation processings on the scan image 200, to thereby generate the recognition object image 511 (see FIG. 26).

This aspect of the variation is useful for the case where the determination method to be used to determine the unit recognition area by the cloud server 90 is uncertain (not specified).

Even when the determination method to be used to determine the unit recognition area by the cloud server 90 is not specified, if any one of the plurality of image generation processings performed on the scan image 200 is the image generation processing in accordance with the determination method, the line areas 401 to 407 in the recognition object image 500 are determined by the cloud server 90 as the unit recognition areas different from one another. By performing the plurality of image generation processings, it is more likely that the line areas 401 to 407 in the recognition object image 500 may be determined by the cloud server 90 as the unit recognition areas different from one another, as compared with the case where a single image generation processing is performed.

Further, though the external terminal 50 is shown as an example of an electronic document generation apparatus in the above-described preferred embodiments and the like, this is only one exemplary case. For example, the MFP 10 may perform various processings (e.g., the process steps in Steps S11 to S16 and S19 shown in FIG. 4) as the electronic document generation apparatus. In other words, instead of using the external terminal 50, there may be a case where the MFP 10 performs the image generation processing and the like, the transmission and reception of various data or the like is performed between the MFP 10 and the cloud server 90, and the MFP 10 generates the electronic document 600.

Furthermore, though the case has been mainly described where each line area is formed of the character string which is horizontally written (one line of character string extending in the horizontal direction) in the above-described preferred embodiments and the like, the present invention is not limited to this case, but the above-described idea can be applied to a case where each line area is formed of the character string which is vertically written (one line (one column) of character string extending in the vertical direction).

While the invention has been shown and described in detail, the foregoing description is in all aspects illustrative and not restrictive. It is therefore understood that numerous modifications and variations can be devised without departing from the scope of the invention.

What is claimed is:

1. An electronic document generation apparatus generating an electronic document in cooperation with a cloud server which separates a character area in a processing object image for an optical character recognition processing into a plurality of unit recognition areas each of which can include an area larger than a line area for one line and performs said optical character recognition processing on each of said plurality of unit recognition areas, said cloud server generating text data as a processing result of said optical character recognition processing on said processing object image, said text data including a character recognition result for each of said plurality of unit recognition areas and a delimiter code added at the end of said character recognition result for said each of said plurality of unit recognition areas, said electronic document generation apparatus comprising:

an extraction part for extracting each of a plurality of line areas from a character area of a scan image of an original;

an image generation part for generating a recognition object image by performing an image processing on said scan image so that said each of said plurality of line areas should be determined by said cloud server as a unit recognition area;

a transmitting part for transmitting said recognition object image to said cloud server as said processing object image for said optical character recognition processing;

a receiving part for receiving said text data which is said processing result of said optical character recognition processing on said recognition object image, from said cloud server; and a document generation part for separating said text data into a plurality of character string data on the basis of said delimiter code included in said text data, determining a correspondence between said plurality of line areas and said plurality of character string data, and generating said electronic document by arranging each of said plurality of character string data in the line area corresponding to said each of said plurality of character string data.

2. The electronic document generation apparatus according to claim 1, further comprising:

a detection part for detecting a position of each of said plurality of line areas in said scan image, wherein said document generation part generates said electronic document by arranging said each of said plurality of character string data at a detection position of said line area corresponding to said each of said plurality of character string data.

3. The electronic document generation apparatus according to claim 1, wherein said image processing includes a process of detecting the height of each of said plurality of line areas and a process of setting a separation interval between each of said plurality of line areas and a line area adjacent thereto to have a size not smaller than the height of a tallest one of said plurality of line areas.

4. The electronic document generation apparatus according to claim 1, wherein said image processing includes a process of detecting the height of each of said plurality of line areas and a process of setting a separation interval between each of said plurality of line areas other than the last line and a line area subsequent thereto to have a size not smaller than the height of said each of said plurality of line areas.

5. The electronic document generation apparatus according to claim 1, wherein said image processing includes a process of adding a delimiter line to a line space area between each of said plurality of line areas and a line area adjacent thereto.

6. The electronic document generation apparatus according to claim 1, wherein said image processing includes a process of adding an end identification image indicating the end of said unit recognition area at an end of each of said plurality of line areas other than at least the last line.

7. The electronic document generation apparatus according to claim 1, wherein said image processing includes a process of setting a character color of each of said plurality of line areas to a character color different from those of adjacent line areas which are adjacent to said each of said plurality of line areas.

8. The electronic document generation apparatus according to claim 1, wherein said image processing includes a process of setting a line head position of each of said plurality of line areas to a position different from those of adjacent line areas which are adjacent to said each of said plurality of line areas.

9. The electronic document generation apparatus according to claim 1, wherein said image processing includes a process of setting a character size of each of said plurality of line areas to a character size different from those of adjacent line areas which are adjacent to said each of said plurality of line areas.

10. The electronic document generation apparatus according to claim 1, wherein said transmitting part inquires of said cloud server, a determination method to be used to determine said unit recognition area by said cloud server, prior to generation of said recognition object image, said receiving part receives information on said determination method from said cloud server, and said image generation part generates said recognition object image by performing an image processing in accordance with said determination method on said scan image.

11. The electronic document generation apparatus according to claim 1, wherein said image generation part generates a plurality of test images which are different from one another, being subjected to a plurality of different image processings, each of said plurality of test images including some of said plurality of line areas, said transmitting part transmits said plurality of test images to said cloud server;

said receiving part receives a plurality of test results which are processing results of said optical character recognition processing performed on said plurality of test images, from said cloud server;

said image generation part detects a character string data count which is a number of pieces of character string data included in each of said plurality of test results on the basis of a delimiter code included in each of said plurality of test results, obtains a number difference which is a difference between the character string data count and a number of some line areas for each of said plurality of test results, obtains one of said plurality of test results, which has a smallest number difference, as a best test result, determines one of said plurality of different image processings corresponding to said best test result as an optimal processing, and generates said recognition object image by performing said optimal processing on remaining line areas which are the rest of said plurality of line areas other than said some line areas, and said document generation part separates data consisting of said best test result and said text data into a plurality of character string data on the basis of a delimiter code included in said best test result and said delimiter code included in said text data, determines a correspondence between said plurality of line areas and said plurality of character string data, and generates said electronic document by arranging each of said plurality of character string data in the line area corresponding to said each of said plurality of character string data.

12. The electronic document generation apparatus according to claim 1, wherein
said transmitting part transmits a plurality of test images generated by performing a plurality of different image processings on a sample image, to said cloud server;
said receiving part receives a plurality of test results which are processing results of said optical character recognition processing performed on said plurality of test images, from said cloud server; and
said image generation part detects a character string data count which is a number of pieces of character string data included in each of said plurality of test results on the basis of a delimiter code included in each of said plurality of test results,
obtains a number difference which is a difference between the character string data count and a number of said line areas included in said sample image for each of said plurality of test results, obtains one of said plurality of test results, which has a smallest number difference, as a best test result, determines one of said plurality of different image processings corresponding to said best test result as an optimal processing, and
generates said recognition object image by performing said optimal processing on said scan image.

13. A non-transitory computer-readable recording medium for recording therein a computer program to be executed by a computer embedded in an electronic document generation apparatus generating an electronic document in cooperation with a cloud server which separates a character area in a processing object image for an optical character recognition processing into a plurality of unit recognition areas each of which can include an area larger than a line area for one line and performs said optical character recognition processing on each of said plurality of unit recognition areas, said cloud server generating text data as a processing result of said optical character recognition processing on said processing object image, said text data including a character recognition result for each of said plurality of unit recognition areas and a delimiter code added at the end of said character recognition result for said each of said plurality of unit recognition areas, to cause said computer to perform the steps of;
a) extracting each of a plurality of line areas from a character area of a scan image of an original;
b) generating a recognition object image by performing an image processing on said scan image so that said each of said plurality of line areas should be determined by said cloud server as a unit recognition area;
c) transmitting said recognition object image to said cloud server as said processing object image for said optical character recognition processing;
d) receiving said text data which is said processing result of said optical character recognition processing on said recognition object image, from said cloud server;
e) separating said text data into a plurality of character string data on the basis of said delimiter code included in said text data and determining a correspondence between said plurality of line areas and said plurality of character string data; and
f) generating said electronic document by arranging each of said plurality of character string data in the line area corresponding to said each of said plurality of character string data.

14. The non-transitory computer-readable recording medium according to claim 13, which records therein said computer program to be executed by said computer, to cause said computer to further perform the step of:
g) detecting a position of each of said plurality of line areas in said scan image,
wherein said electronic document is generated by arranging said each of said plurality of character string data at a detection position of said line area corresponding to said each of said plurality of character string data on the basis of said position detected in said step (g), in said step (f).

15. The non-transitory computer-readable recording medium according to claim 13, wherein
said image processing includes a process of detecting the height of each of said plurality of line areas and a process of setting a separation interval between each of said plurality of line areas and a line area adjacent thereto to have a size not smaller than the height of a tallest one of said plurality of line areas.

16. The non-transitory computer-readable recording medium according to claim 13, wherein
said image processing includes a process of detecting the height of each of said plurality of line areas and a process of setting a separation interval between each of said plurality of line areas other than the last line and a line area subsequent thereto to have a size not smaller than the height of said each of said plurality of line areas.

17. The non-transitory computer-readable recording medium according to claim 13, wherein
said image processing includes a process of adding a delimiter line to a line space area between each of said plurality of line areas and a line area adjacent thereto.

18. The non-transitory computer-readable recording medium according to claim 13, wherein
said image processing includes a process of adding an end identification image indicating an end of said unit recognition area at the end of each of said plurality of line areas other than at least the last line.

19. The non-transitory computer-readable recording medium according to claim 13, wherein
said image processing includes a process of setting a character color of each of said plurality of line areas to a character color different from those of adjacent line areas which are adjacent to said each of said plurality of line areas.

20. The non-transitory computer-readable recording medium according to claim 13, wherein
said image processing includes a process of setting a line head position of each of said plurality of line areas to a position different from those of adjacent line areas which are adjacent to said each of said plurality of line areas.

21. The non-transitory computer-readable recording medium according to claim 13, wherein
said image processing includes a process of setting a character size of each of said plurality of line areas to a character size different from those of adjacent line areas which are adjacent to said each of said plurality of line areas.

22. The non-transitory computer-readable recording medium according to claim 13, which records therein said computer program to be executed by said computer, to cause said computer to further perform the step of:

h) inquiring of said cloud server, a determination method to be used to determine said unit recognition area by said cloud server, prior to said step (b); and i) receiving information on said determination method from said cloud server, wherein said recognition object image is generated by performing an image processing in accordance with said determination method on said scan image in said step (b).

23. The non-transitory computer-readable recording medium according to claim 13, which records therein said computer program to be executed by said computer, to cause said computer to further perform the step of;

h) generating a plurality of test images which are different from one another, being subjected to a plurality of different image processings, each of said plurality of test images including some of said plurality of line areas, prior to said step (b);

i) transmitting said plurality of test images to said cloud server;

j) receiving a plurality of test results which are processing results of said optical character recognition processing performed on said plurality of test images, from said cloud server;

k) detecting a character string data count which is a number of pieces of character string data included in each of said plurality of test results on the basis of a delimiter code included in each of said plurality of test results which are received from said cloud server; and l) obtaining a number difference which is a difference between the character string data count and a number of some line areas for each of said plurality of test results, obtaining one of said plurality of test results, which has a smallest number difference, as a best test result, and determining one of said plurality of different image processings corresponding to said best test result as an optimal processing, wherein said recognition object image is generates by performing said optimal processing on remaining line areas which are the rest of said plurality of line areas other than said some line areas and in said step (b), and data consisting of said best test result and said text data is separated into a plurality of character string data on the basis of a delimiter code included in said best test result and said delimiter code included in said text data, and a correspondence between said plurality of line areas and said plurality of character string data is determined in said step (e).

24. The non-transitory computer-readable recording medium according to claim 13, which records therein said computer program to be executed by said computer, to cause said computer to further perform the step of:

h) transmitting a plurality of test images generated by performing a plurality of different image processings on a sample image, prior to said step (b);

i) receiving a plurality of test results which are processing results of said optical character recognition processing performed on said plurality of test images, from said cloud server;

j) detecting a character string data count which is a number of pieces of character string data included in each of said plurality of test results on the basis of a delimiter code included in each of said plurality of test results which are received from said cloud server; and k) obtaining a number difference which is a difference between the character string data count and a number of some line areas for each of said plurality of test results, obtaining one of said plurality of test results, which has a smallest number difference, as a best test result, and determining one of said plurality of different image processings corresponding to said best test result as an optimal processing, wherein said recognition object image is generated by performing said optimal processing on said scan image in said step b).

25. An electronic document generation system comprising:

an image forming apparatus for generating a scan image of an original; and an electronic document generation apparatus for generating an electronic document on the basis of said scan image in cooperation with a cloud server, wherein said cloud server separates a character area in a processing object image for an optical character recognition processing into a plurality of unit recognition areas each of which can include an area larger than a line area for one line and performs said optical character recognition processing on each of said plurality of unit recognition areas, and generates text data as a processing result of said optical character recognition processing on said processing object image, said text data including a character recognition result for each of said plurality of unit recognition areas and a delimiter code added at the end of said character recognition result for said each of said plurality of unit recognition areas, and wherein said image forming apparatus has a communication part for transmitting said scan image to said electronic document generation apparatus, and wherein said electronic document generation apparatus has an extraction part for extracting each of a plurality of line areas from a character area of said scan image received from said image forming apparatus;

an image generation part for generating a recognition object image by performing an image processing on said scan image so that said each of said plurality of line areas should be determined by said cloud server as a unit recognition area;

a transmitting part for transmitting said recognition object image to said cloud server as said processing object image for said optical character recognition processing;

a receiving part for receiving said text data which is said processing result of said optical character recognition processing on said recognition object image, from said cloud server; and a document generation part for separating said text data into a plurality of character string data on the basis of said delimiter code included in said text data, determining a correspondence between said plurality of line areas and said plurality of character string data, and generating said electronic document by arranging each of said plurality of character string data in the line area corresponding to said each of said plurality of character string data.

* * * * *